US012710938B2

(12) United States Patent
Ding et al.

(10) Patent No.: US 12,710,938 B2
(45) Date of Patent: Aug. 18, 2026

(54) APPLICATION PAGE DEVELOPMENT METHOD, APPARATUS, SYSTEM, COMPUTING DEVICE, AND STORAGE MEDIUM

(71) Applicant: Huawei Cloud Computing Technologies Co., Ltd., Guizhou (CN)

(72) Inventors: Zhiyu Ding, Hangzhou (CN); Zhaosong Huang, Gui'an (CN); Xinxin Huang, Shenzhen (CN); Zhiyi Chen, Gui'an (CN); Xiaofeng Deng, Gui'an (CN); Minglei Li, Gui'an (CN); Xiaoyuan Yu, Hangzhou (CN); Jing Yuan, Gui'an (CN)

(73) Assignee: HUAWEI CLOUD COMPUTING TECHNOLOGIES CO., LTD., Guizhou (CN)

( * ) Notice: Subject to any disclaimer, the term of this patent is extended or adjusted under 35 U.S.C. 154(b) by 228 days.

(21) Appl. No.: 18/613,545

(22) Filed: Mar. 22, 2024

(65) Prior Publication Data

US 2024/0264812 A1 Aug. 8, 2024

Related U.S. Application Data

(63) Continuation of application No. PCT/CN2022/119612, filed on Sep. 19, 2022.

(30) Foreign Application Priority Data

Sep. 23, 2021 (CN) .......................... 202111114661.3

(51) Int. Cl.
*G06F 8/38* (2018.01)

(52) U.S. Cl.
CPC ...................................... *G06F 8/38* (2013.01)

(58) Field of Classification Search
CPC ............................ G06F 3/048–05; G06F 8/38
See application file for complete search history.

(56) References Cited

U.S. PATENT DOCUMENTS

| | | | | |
|---|---|---|---|---|
| 5,619,636 A * | 4/1997 | Sweat | G06F 16/40 | 345/473 |
| 7,765,097 B1 * | 7/2010 | Yu | G06F 40/174 | 704/9 |
| 10,191,889 B2 * | 1/2019 | Nguyen | G06F 40/103 | |
| 10,489,122 B1 * | 11/2019 | Abbott | G06F 8/34 | |
| 11,119,735 B1 * | 9/2021 | Baafi | G06F 8/33 | |
| 11,221,833 B1 * | 1/2022 | Huang | G06N 3/08 | |
| 11,640,492 B2 * | 5/2023 | Fialkow | G06F 40/143 | 715/235 |

(Continued)

FOREIGN PATENT DOCUMENTS

| | | |
|---|---|---|
| CN | 110543307 A | 12/2019 |
| CN | 111984254 A | 11/2020 |
| WO | 2021041052 A1 | 3/2021 |

*Primary Examiner* — Daniel Rodriguez
(74) *Attorney, Agent, or Firm* — Conley Rose, P.C.

(57) ABSTRACT

An application page development method includes a static page of a target application being first obtained, and then an application page including an interaction function corresponding to interaction description information being generated based on the interaction description information input by a user and the static page. In other words, the application page has a function of interacting with the user.

18 Claims, 10 Drawing Sheets

(56) References Cited

U.S. PATENT DOCUMENTS

| | | | | |
|---|---|---|---|---|
| 2008/0120538 | A1* | 5/2008 | Kurz | G06F 16/972 715/255 |
| 2012/0311471 | A1* | 12/2012 | Bullard | G06F 11/3684 715/764 |
| 2014/0047413 | A1* | 2/2014 | Sheive | G06F 8/33 717/110 |
| 2018/0101506 | A1* | 4/2018 | Hodaei | G06F 9/451 |
| 2019/0034172 | A1* | 1/2019 | Kostello | G10L 15/1815 |
| 2020/0159552 | A1 | 5/2020 | Bodin et al. | |
| 2021/0011592 | A1* | 1/2021 | Liu | G06F 3/048 |

* cited by examiner

APPLICATION PAGE DEVELOPMENT METHOD, APPARATUS, SYSTEM, COMPUTING DEVICE, AND STORAGE MEDIUM

CROSS-REFERENCE TO RELATED APPLICATIONS

This is a continuation of International Patent Application No. PCT/CN2022/119612 filed on Sep. 19, 2022, which claims priority to Chinese Patent Application No. 202111114661.3 filed on Sep. 23, 2021. The disclosures of the aforementioned applications are hereby incorporated by reference in their entireties.

TECHNICAL FIELD

This application relates to the field of artificial intelligence (AI) technologies, and in particular, to an application page development method, an apparatus, a system, a computing device, and a storage medium.

BACKGROUND

With development of network technologies and deepening of service requirements, various applications emerge one after another. During application development, application page development is an important step. The application page development mainly includes sorting out a function requirement of an application page, designing a static page of the application page, designing an interaction function between various components on the application page, developing code of the application page, and the like. This process is related to a plurality of professional technologies, resulting in a higher personnel threshold for the application page development. In addition, an increasing quantity of functions may need to be implemented by current applications. As a result, the application page development becomes increasingly complex. Based on this, a quick and convenient application page development method can reduce difficulty and a workload of the application page development.

SUMMARY

Embodiments of this application provide an application page development method, an apparatus, a system, a computing device, and a storage medium. This can reduce difficulty and a workload of application page development. Technical solutions are as follows.

According to a first aspect, an application page development method is provided. The method includes: obtaining a static page of a target application, where the static page includes a plurality of page components; receiving interaction description information input by a user, where the interaction description information describes an interaction function corresponding to at least one-page component on the static page; and generating an application page of the target application based on the static page and the interaction description information, where the application page includes an interaction function corresponding to the interaction description information.

In an embodiment of this application, the static page of the target application may be first obtained, and then the application page including the interaction function corresponding to the interaction description information is generated based on the interaction description information input by the user and the static page. In other words, the application page has a function of interacting with the user. It can be learned that, in this embodiment of this application, construction of a low-code interactive application page is implemented, which is convenient and efficient.

Optionally, the interaction description information is voice information or text information.

In this embodiment of this application, the user may input the interaction description information of the static page in a form of voice or text, which is more intelligent and user-friendly.

Optionally, an implementation process of the generating an application page of the target application based on the static page and the interaction description information is: fusing code of the static page and the interaction code, to obtain code of a candidate application page; displaying the candidate application page based on the code of the candidate application page by using an interaction optimization interface; and adjusting the candidate application page based on an interaction function editing operation performed by the user, to obtain the application page of the target application.

In this embodiment of this application, the code of the static page and the interaction code can be automatically fused, to obtain the code of the candidate page, which is more convenient. The candidate application page is displayed on the interaction optimization interface, so that the user performs the interaction function editing operation on the candidate application page, to obtain the application page of the target application. In this way, a design intention of the user can be more accurately grasped, and an objective of a designer, namely, a developer, is achieved.

Optionally, the interaction optimization interface further includes an interface tool set, the interface tool set includes a plurality of interaction tools, and each interaction tool indicates an interaction function. An implementation process of the adjusting the candidate application page based on an interaction function editing operation performed by the user, to obtain the application page of the target application is: adding, to the code of the candidate application page based on a drag operation performed by the user on a target interaction tool in the plurality of interaction tools, code corresponding to an interaction function indicated by the target interaction tool; and providing the application page of the target application based on updated code.

In this embodiment of this application, the user drags the interaction tool included in the interaction tool set on the interaction optimization interface to the candidate application page, to implement the interaction function editing operation on the candidate application page, which is convenient.

Optionally, an implementation process of the adjusting the candidate application page based on an interaction function editing operation performed by the user, to obtain the application page of the target application may be: interacting with the user by using an AI dialog model, to obtain interaction function editing information of the candidate application page; recommending a modification suggestion to the user based on the interaction function editing information and an industry knowledge graph by using the AI dialog model; when a confirmation operation performed by the user on the modification suggestion is received, updating the code of the candidate application page based on the interaction function editing information and the modification suggestion; and providing the application page of the target application based on updated code.

In this embodiment of this application, the AI dialog model is used to perform a plurality of rounds of interaction with the user to complete interaction construction on the candidate application page, to obtain the application page of the target application. In a process of interaction between the user and the AI dialog model, the AI dialog model recommends the modification suggestion to the user, to inspire the user to perform further optimization and complete the interaction construction. This process implements code-free interaction construction, implements real man-machine collaborative intelligent construction, and achieves an objective of a user, that is, a developer.

Optionally, the interaction optimization interface further includes the code of the candidate application page. An implementation process of the adjusting the candidate application page based on an interaction behavior editing operation performed by the user, to obtain the application page of the target application may be: updating the code of the candidate application page based on a modification operation performed by the user on the code of the candidate application page; and providing the application page of the target application based on updated code.

In this embodiment of this application, the user may directly adjust the code of the candidate application page, to adjust the candidate application page. In this way, a person skilled in using code can more accurately implement the interaction function editing operation on the candidate application page.

Optionally, after the code of the candidate application page is updated, the updated code may be displayed by using the interaction optimization interface, and an updated part in the updated code is highlighted.

In this embodiment of this application, the updated code is highlighted to facilitate inspection and modification by the user.

Optionally, the application page development method further includes: obtaining a plurality of first training samples, where each first training sample includes code of a static page sample, an interaction description sample corresponding to the static page sample, and interaction code; and training a to-be-trained first AI model based on the plurality of first training samples, to obtain the interaction code generation model.

In this embodiment of this application, the first AI model is trained by using the plurality of first training samples, to obtain the interaction code generation model. Subsequently, the interaction code generation model is used to generate corresponding interaction code based on the interaction description information input by the user, and then an interactive dynamic application page is constructed based on the interaction code, without a need for the user to write the interaction code. This helps implement construction of a low-code dynamic page, reduce difficulty of application page development, and improve development efficiency.

Optionally, an implementation process of the obtaining a static page of a target application may be: receiving a design diagram of the application page of the target application; identifying the design diagram by using a static page generation model, to obtain a plurality of groups of intermediate codes, where the intermediate code includes component information of a page component obtained from the design diagram through identification; generating a static candidate page corresponding to each group of intermediate codes; and determining a first static candidate page from a plurality of static candidate pages, and generating the static page of the target application based on the first static candidate page.

In this embodiment of this application, the design diagram is identified by using the static page generation model, to obtain the plurality of groups of intermediate codes, and then the plurality of static candidate pages is obtained based on the plurality of groups of intermediate codes. In this way, the user may determine one first static candidate page from the plurality of static candidate pages. It can be learned that, in this embodiment of this application, when obtaining the static page of the target application, the user may select one static candidate page from a plurality of generated static candidate pages, so that a finally obtained static page can better fit a design intention of the user.

Optionally, an implementation process of the generating the static page of the target application based on the first static candidate page may be: displaying the first static candidate page by using the interaction optimization interface; and adjusting the first static candidate page based on an adjustment operation performed by the user, to obtain the static page of the target application.

In this embodiment of this application, the user may adjust the first static candidate application page on the interaction optimization interface, to obtain the static page of the target application, which is more convenient and efficient.

Optionally, the adjustment operation includes at least one of: an operation of adding a component, an operation of deleting a component, and an operation of modifying a component on the first static candidate page, the operation of modifying a component includes modifying a location, a style, and a size of the component, and the adjustment operation includes at least one of: an operation of dragging a component and an operation of configuring an attribute value of a component.

In this embodiment of this application, the user may add, delete, and modify a component on the first static candidate page to adjust the candidate page, and these adjustment operations on the component may be implemented by dragging the component or configuring the attribute value of the component, thereby implementing construction of a low-code static page.

Optionally, the application page development method further includes: obtaining a plurality of second training samples, where each second training sample includes a design diagram sample of an application page and annotation information of each component included in the design diagram sample, and the annotation information includes type information, location information, and size information of a corresponding component; and training a to-be-trained second AI model based on the plurality of second training samples, to obtain the static page generation model.

In this embodiment of this application, the to-be-trained second AI model is trained by using the plurality of second training samples, to obtain the static page generation model. Subsequently, the static page generation model is used to generate a static page based on a design diagram input by the user, so that construction of a low-code or code-free static page is implemented, thereby reducing difficulty of application page development and improving development efficiency.

According to a second aspect, a page generation apparatus is provided. The page generation apparatus has a function of generating an application page of a target application in the first aspect. The page generation apparatus includes at least one module, and the at least one module is configured to implement the application page development method provided in the first aspect.

According to a third aspect, a training apparatus is provided. The training apparatus has a function of implementing training of the AI model in the first aspect. The training apparatus includes at least one module, and the at least one module is configured to implement the method for training the AI model provided in the first aspect.

According to a fourth aspect, an application page development system is provided, where the application page development system includes the page generation apparatus according to the second aspect and the training apparatus according to the third aspect. The page generation apparatus is configured to generate an application page of a target application based on a trained AI model, and the training apparatus is configured to train an AI model.

According to a fifth aspect, a computing device is provided. A structure of the computing device includes a processor and a memory. The memory is configured to store a program that supports the computing device to perform the application page development method provided in the first aspect, and store data used to implement the application page development method provided in the first aspect. The processor is configured to execute the program stored in the memory.

According to a sixth aspect, a computer-readable storage medium is provided. The computer-readable storage medium stores instructions. When the instructions are run on a computer, the computer is enabled to perform the application page development method according to the first aspect.

According to a seventh aspect, a computer program product including instructions is provided. When the computer program product is run on a computer, the computer is enabled to perform the application page development method according to the first aspect.

Technical effects achieved by the second aspect, the third aspect, the fourth aspect, the fifth aspect, the sixth aspect, and the seventh aspect are similar to technical effects achieved by corresponding technical means in the first aspect. Details are not described herein again.

The technical solutions provided in embodiments of this application bring at least the following beneficial effects.

In embodiments of this application, the static page of the target application may be first obtained, and then the application page including the interaction function corresponding to the interaction description information is generated based on the interaction description information input by the user and the static page. In other words, the application page has a function of interacting with the user. It can be learned that, in embodiments of this application, construction of a low-code interactive application page is implemented, which is convenient and efficient.

DESCRIPTION OF EMBODIMENTS

To make objectives, technical solutions, and advantages of embodiments of this application clearer, the following further describes implementations of this application in detail with reference to the accompanying drawings.

An application scenario of embodiments of this application is first described before embodiments of this application are described in detail.

Currently, with development of network technologies and deepening of service requirements, various applications emerge one after another. During application development, application page development is an important step. The application page development mainly includes sorting out a function requirement of an application page, designing a static page of the application page, designing an interaction function between various components on the application page, developing code of the application page, and the like. This includes a plurality of professional development technologies including visualization, graphics, and performance optimization. However, few developers can be skilled in these professional development technologies at the same time. As a result, a personnel threshold for the application page development is higher. In addition, because an increasing quantity of functions need to be implemented by current applications, the application page development becomes increasingly complex, technical difficulty becomes increasingly high, and a workload becomes increasingly heavy. Consequently, the application page development becomes a service bottleneck. Based on this, embodiments of this application provide a method for intelligently developing an application page based on an AI model. The method may be applied to scenarios such as customer requirement verification, scenario development, application page sample development, proof of concept (POC) program development, and formal product development of an entity such as an enterprise, thereby greatly reducing difficulty and a workload of the application page development, and improving efficiency of the application page development.

It should be noted that the application page development method provided in an embodiment of this application is performed by an application page development system 01. The application page development system 01 may be implemented by a software system, may be implemented by a hardware device, or may be implemented by a combination of a software system and a hardware device.

Figure 1:
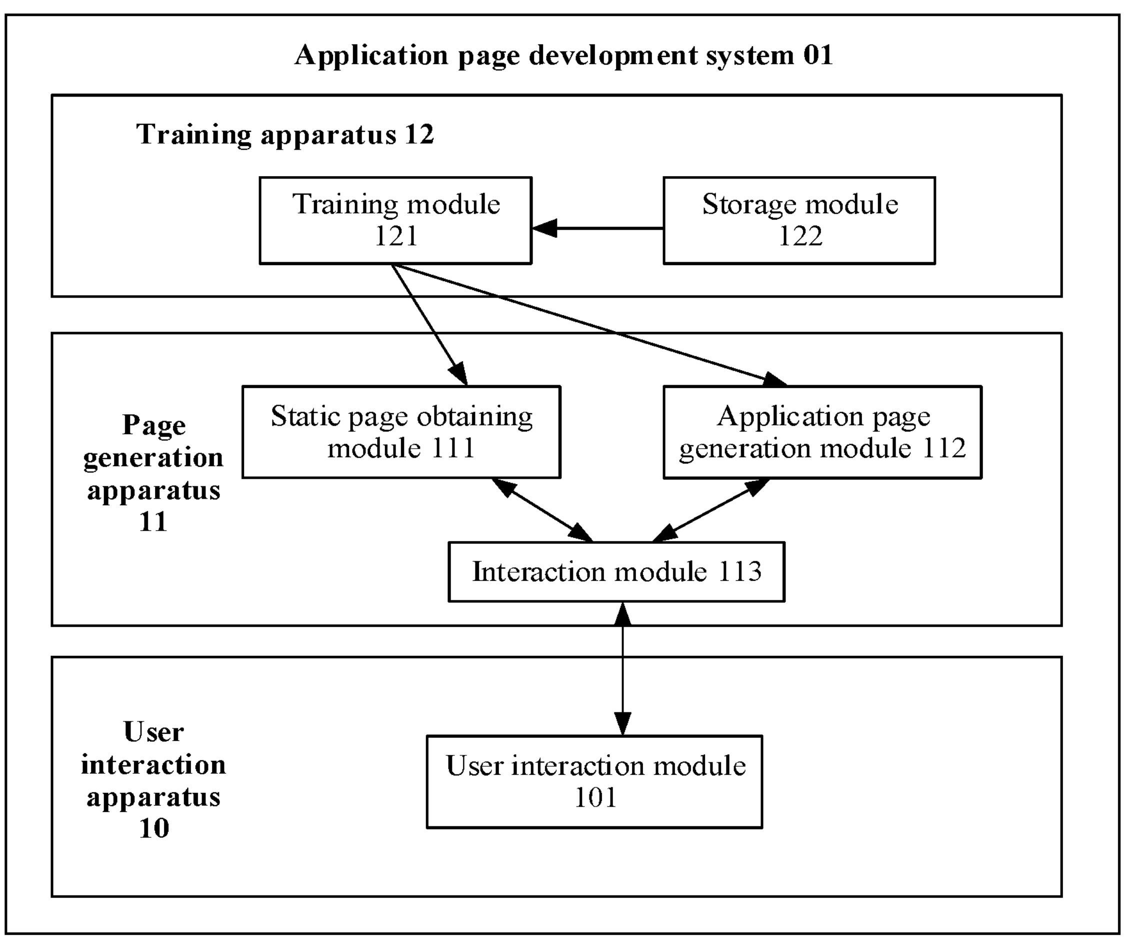
FIG. 1 is a schematic diagram of a structure of an application page development system according to an embodiment of this application.

Refer to FIG. 1. When the application page development system 01 is a software system, the application page development system 01 may be logically divided to a user interaction apparatus 10 and a page generation apparatus 11. The user interaction apparatus 10 and the page generation apparatus 11 may logically include one or more modules, and each module has a different function. For example, refer to FIG. 1. The page generation apparatus 11 includes a static page obtaining module 111, an application page generation module 112, and an interaction module 113. It should be noted that division of structures and functional modules of various apparatuses is merely an example in this embodiment of this application, but specific division is not limited thereto.

The user interaction apparatus 10 is configured to interact with a user, to receive information input by the user and provide to-be-presented information to the user. For example, the user interaction apparatus 10 may receive a static page of a target application that is sent by the page generation apparatus, display the static page of the target application to the user, receive interaction description information that is input by the user and that describes an interaction function corresponding to a page component on the static page, and send the interaction description information to the page generation apparatus 11. The interaction description information may be at least one of description information in a form of voice and description information in a form of text.

Optionally, before displaying the static page of the target application to the user, the user interaction apparatus 10 may further receive a design diagram that is of the application page of the target application and that is input by the user, and send the design diagram to the page generation apparatus 11, so that the page generation apparatus 11 generates the static page of the target application based on the design diagram.

The static page obtaining module 111 is configured to obtain the static page of the target application. The static page is a page that includes a page component but does not include interaction logic. That the static page does not include the interaction logic means that the static page does not include an interaction function. In other words, the static page is a page that cannot interact with the user.

In some possible implementations, the static page obtaining module 111 includes a static page generation model. In this case, the static page obtaining module 111 may receive a design diagram that is of the application page of the target application and that is sent by the interaction module 113, and generate the static page of the target application based on the static page generation model.

It should be noted that the static page generation model is an AI model trained by using a plurality of training samples. The static page generation model is used to identify component information of a page component in the design diagram of the application page of the target application. The static page obtaining module 111 may generate the static page based on the component information of the page component in the design diagram that is identified by the static page generation model.

The application page generation module 112 is configured to communicate with the static page generation module 111 and the interaction module 113, receive a static page of the target application that is obtained by the static page generation module 111 and interaction description information of the static page that is sent by the interaction module 113, and generate an application page of the target application based on the static page and the interaction description information. The generated application page of the target application is a dynamic page that can interact with the user. In other words, the application page not only includes content on the static page, but also includes an interaction function corresponding to the interaction description information input by the user.

In some possible implementations, the application page generation module 112 includes an interaction code generation model. In this case, after receiving the static page of the target application and the interaction description information, the application page generation module 112 generates interaction code corresponding to the interaction description information based on the interaction code generation model, and further generates the application page of the target application based on the static page and the interaction code.

It should be noted that the interaction code generation model is a natural language model trained by using a plurality of training samples. The interaction code generation model can generate, based on the interaction description information of the static page and the static page that are input by the user, the interaction code corresponding to the interaction description information.

The interaction module 113 is configured to communicate with the user interaction apparatus 10, the static page obtaining module 111, and the application page generation module 112, receive a static page sent by the static page obtaining module 111, and send the static page to the user interaction apparatus 10, so that the user interaction apparatus 10 displays the static page to the user. Then, the interaction module 113 receives interaction description information of an interaction function corresponding to at least one page component on the static page that is sent by the user interaction apparatus 10 and that is input by the user based on the static page, and sends the interaction description information to the application page generation module 112, so that the application page generation module 112 generates the application page of the target application.

Optionally, in some possible implementations, the interaction module 113 may further receive a design diagram that is of the application page of the target application and that is sent by the user interaction apparatus 10, and send the design diagram to the static page obtaining module 111, so that the static page obtaining module 111 generates the static page of the target application based on the design diagram.

It can be learned from the foregoing descriptions that both the static page generation model and the interaction code generation model are trained AI models. Based on this, the application page development system 01 may further include a training apparatus 12. In this way, before the two models are used for application page development, the training apparatus 12 may train the two models. For example, refer to FIG. 1. The training apparatus 12 includes a training module 121 and a storage module 122.

The storage module 122 stores a plurality of second training samples used to obtain the static page generation model through training and a plurality of first training samples used to obtain the interaction code generation model through training.

The training module 121 is configured to obtain the plurality of first training samples and the plurality of second training samples from the storage module 122. Then, the static page generation model is obtained through training based on the plurality of second training samples, and the interaction code generation model is obtained through training based on the plurality of first training samples.

It should be noted that the training apparatus 12 may be an independent apparatus. In this case, the static page generation model and the interaction code generation model that are obtained through training by the training module 121 are respectively deployed in the static page obtaining module 111 and the application page generation module 112. Optionally, the training apparatus 12 may alternatively be a part of the page generation apparatus 11. This is not limited in embodiments of this application.

Various apparatuses in the application page development system 01 described above may be flexibly deployed. For example, the user interaction apparatus 10 in the application page development system 01 may be deployed on a client, and the page generation apparatus 11 and the training apparatus 12 may be deployed in a cloud environment. The cloud environment is an entity that uses a basic resource to provide a cloud service for a user in a cloud computing mode. The cloud environment includes a cloud data center and a cloud service platform.

Figure 2:
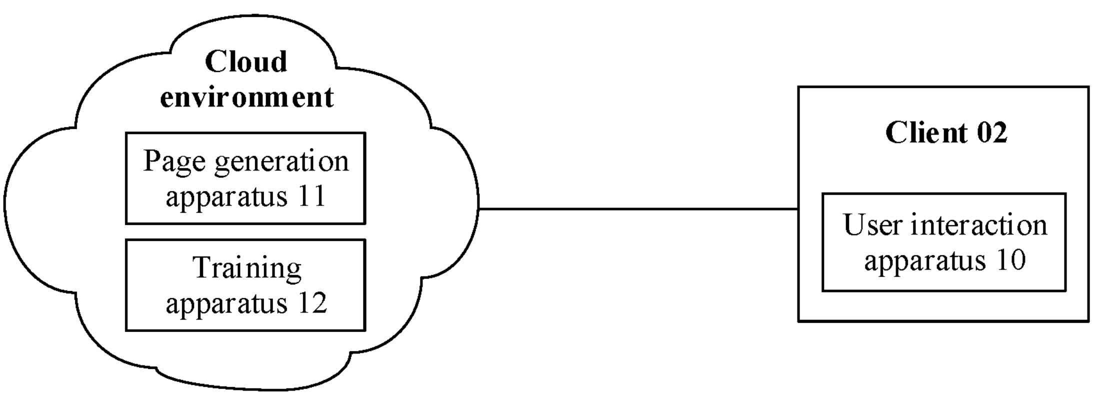
FIG. 2 is a schematic diagram of deployment of an application page development system according to an embodiment of this application.

The cloud data center includes a large quantity of basic resources (including computing resources, storage resources, and network resources) owned by a cloud service provider. The computing resources included in the cloud data center may be a large quantity of computing devices (for example, servers). The page generation apparatus 11 in the application page development system 01 may be deployed on a server or a virtual machine in the cloud data center. Software modules in the apparatus may be deployed on a plurality of servers in a distributed manner, deployed on a plurality of virtual machines in a distributed manner, or deployed on both virtual machines and servers in a distributed manner. For example, as shown in FIG. 2, the page generation apparatus 11 and the training apparatus 12 in the application page development system 01 are deployed in the cloud environment, and the user interaction apparatus 10 is deployed in a client 02. In this way, the user interaction apparatus 10 in the client 02 may send the design diagram of the application page of the target application to the page generation apparatus 11. After receiving the design diagram of the application page of the target application, the page generation apparatus 11 may identify the design diagram of the application page of the target application based on the static page generation model, and generate a static page of the target application based on an identification result. Then, the page generation apparatus feeds back the static page to the user interaction apparatus 10 in the client 02. Subsequently, the user interaction apparatus 10 in the client 02 may send, to the page generation apparatus 11, interaction description information that is of the static page and that is input by the user. The page generation apparatus 11 generates an application page of the target application based on the interaction description information and the static page, and feeds back the application page of the target application to the client 02, so that the client 02 displays the application page to the user by using the user interaction apparatus 10.

Figure 3:
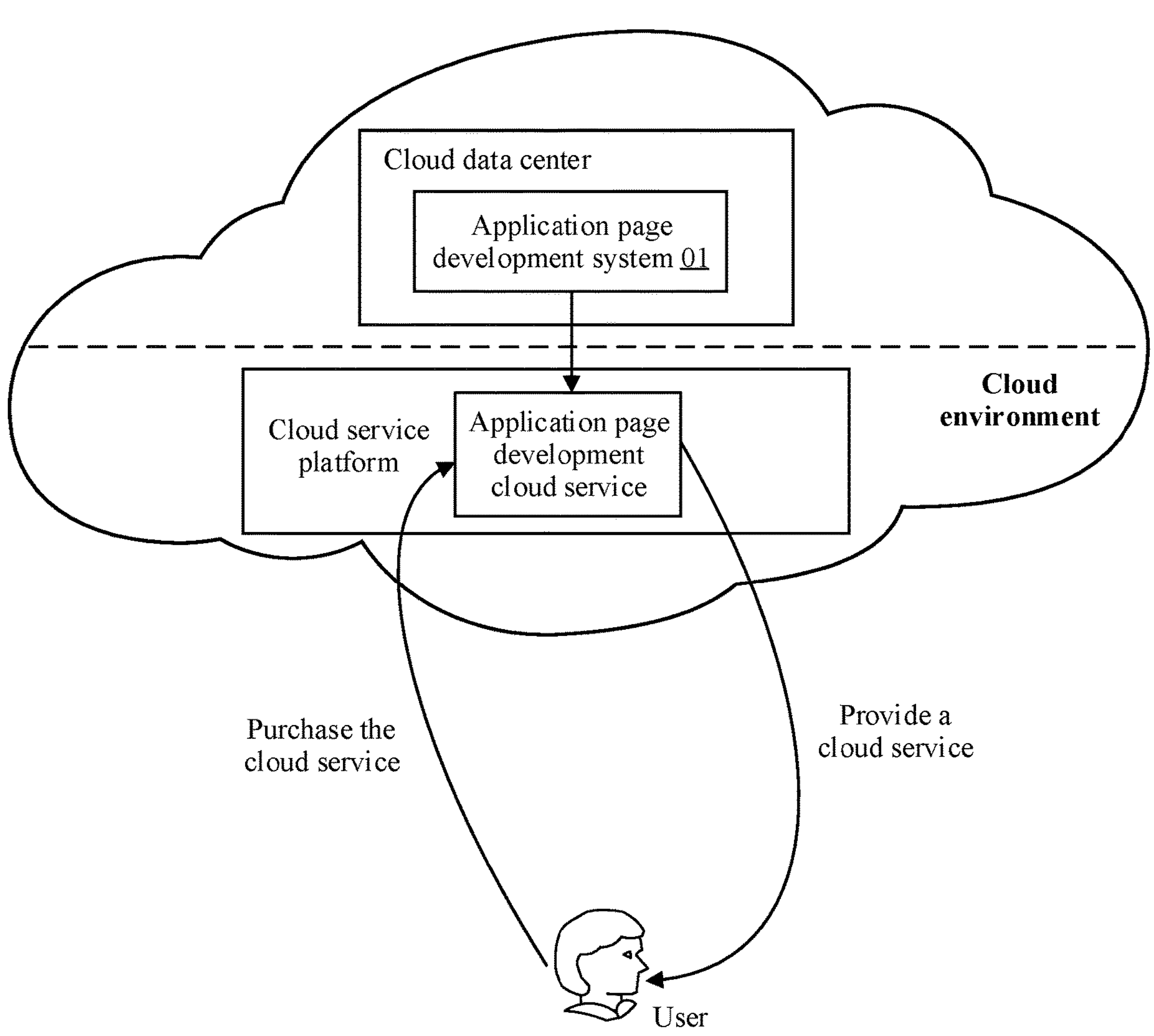
FIG. 3 is a schematic diagram of application of an application page development system according to an embodiment of this application.

For example, FIG. 3 is a schematic diagram of application of the application page development system 01 according to this application. As shown in FIG. 3, the application page development system 01 may be deployed in the cloud data center by a cloud service provider. The cloud service provider abstracts a function provided by the application page development system 01 to a cloud service, and the cloud service platform provides a user with consultation and purchase of the cloud service. After purchasing the cloud service, the user may use an application page development service provided by the application page development system 01 in the cloud data center. The application page development system 01 may alternatively be deployed by a tenant in a computing resource of a cloud data center leased by the tenant. The tenant purchases, by using the cloud service platform, a computing resource cloud service provided by a cloud service provider, and runs the application page development system 01 in the purchased computing resource, so that the application page development system 01 performs application page development.

Figure 4:
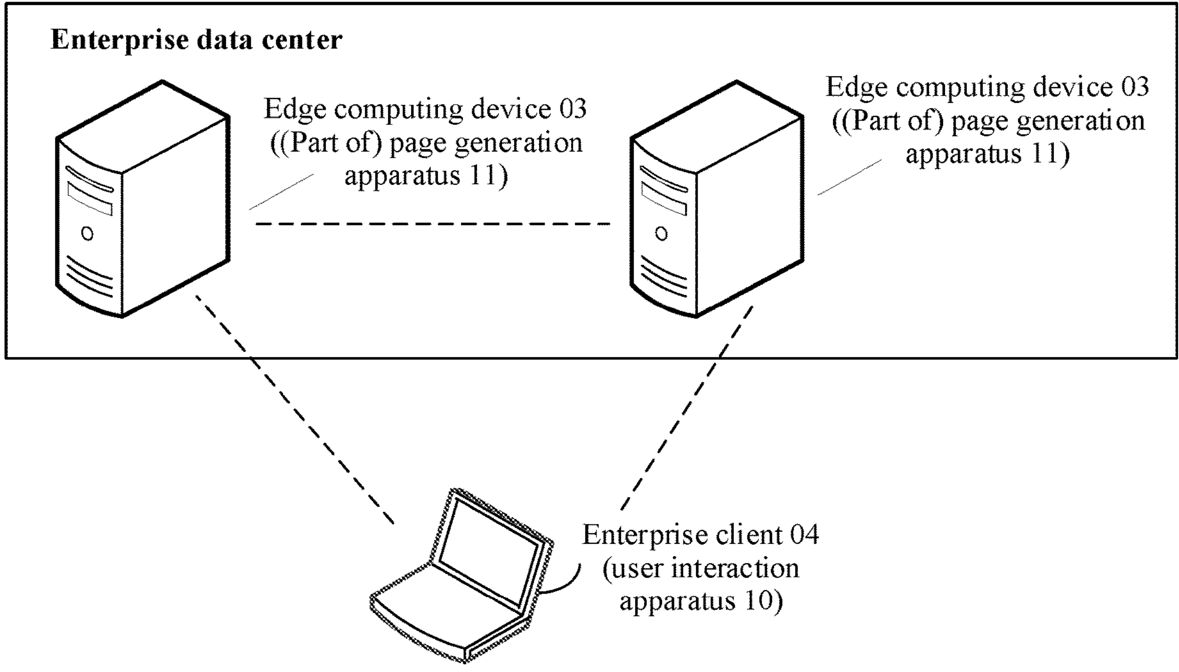
FIG. 4 is a schematic diagram of deployment of another application page development system according to an embodiment of this application.

Optionally, the page generation apparatus 11 and the training apparatus 12 in the application page development system 01 may alternatively be software apparatuses that run on an edge computing device in an edge environment, or include one or more edge computing devices in an edge environment. The edge environment is a device set that includes one or more edge computing devices in an application scenario. The one or more edge computing devices may be computing devices in one data center or computing devices in a plurality of data centers. When the page generation apparatus 11 and the training apparatus 12 are software apparatuses, the two apparatuses or various modules in the two apparatuses may be deployed on a plurality of edge computing devices in a distributed manner, or may be deployed on one edge computing device in a centralized manner. For example, as shown in FIG. 4, the page generation apparatus 11 and the training apparatus 12 are deployed in an edge computing device 03 included in a data center of an enterprise in a distributed manner, and the user interaction apparatus 10 is deployed in a client 04 of the enterprise. In this case, the user interaction apparatus 10 in the client 04 of the enterprise may send the design diagram of the application page of the target application to the page generation apparatus 11. After receiving the design diagram, the page generation apparatus 11 may generate a static page based on the design diagram, and feed back the static page to the client 04. Then, the client 04 sends, to the page generation apparatus 11 by using the user interaction apparatus 10, interaction description information that is of the static page and that is input by the user. The page generation apparatus 11 generates an application page of the target application based on the interaction description information and the static page, and feeds back the application page of the target application to the client 04, so that the client 02 displays the application page to the user by using the user interaction apparatus 10.

When the application page development system 01 is implemented by a hardware device, the application page development system 01 may be implemented by using one or more computing devices in any environment. For example, the application page development system 01 may be implemented by the edge computing device and the client described above, may be implemented by the computing device and the client in the cloud environment described above, or may be directly implemented by a terminal device.

Figure 5:
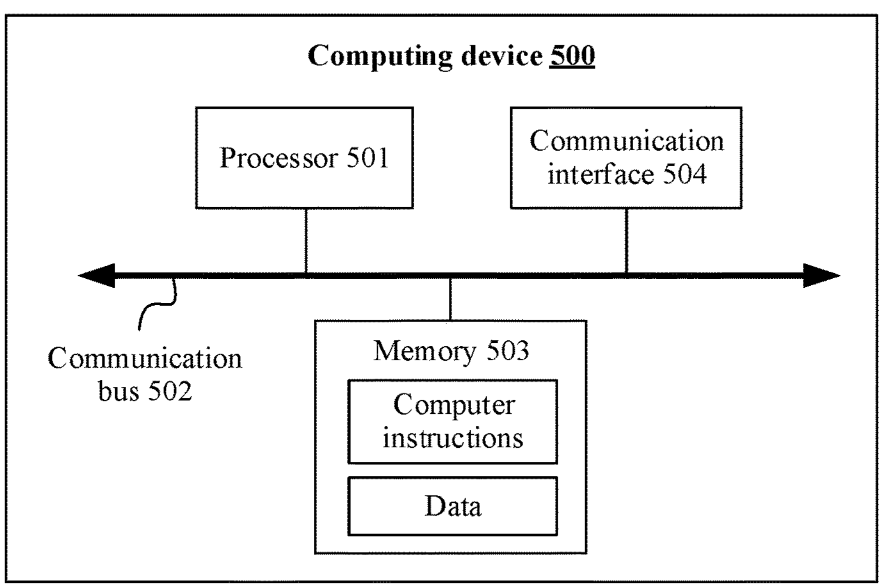
FIG. 5 is a schematic diagram of a structure of a computing device according to an embodiment of this application.

This is not limited in embodiments of this application. FIG. 5 is a schematic diagram of a structure of a computing device 500 according to an embodiment of this application. The computing device 500 includes a processor 501, a communication bus 502, a memory 503, and at least one communication interface 504.

The processor 501 may be a general-purpose central processing unit (CPU), an application-specific integrated circuit (ASIC), a graphics processing unit (GPU), or any combination thereof. The processor 501 may include one or more chips. The processor 501 may include an AI accelerator, for example, a neural network processor (NPU).

The communication bus 502 may include a path for transferring information between components (for example, the processor 501, the memory 503, and the communication interface 504) of the computing device 500.

The memory 503 may be a read-only memory (ROM) or another type of static storage device that can store static information and instructions, a random-access memory (RAM) or another type of dynamic storage device that can store information and instructions, or may be an electrically erasable programmable read-only memory (EEPROM), a compact disc read-only memory (CD-ROM) or another compact disc storage, an optical disc storage (including a compact optical disc, a laser disc, an optical disc, a digital versatile optical disc, a Blu-ray optical disc, or the like), a magnetic disk storage medium or another magnetic storage device, or any other medium that can be used to carry or store expected program code in a form of instructions or data structures and that can be accessed by a computer. However, the memory 503 is not limited thereto. The memory 503 may exist independently, and is connected to the processor 501 through the communication bus 502. Alternatively, the memory 503 may be integrated with the processor 501. The memory 503 may store computer instructions. When the computer instructions stored in the memory 503 are executed by the processor 501, the application page development method in this application may be implemented. In addition, the memory 503 may further store data required by the processor in a process of performing the foregoing method, and intermediate data and/or result data generated by the processor.

The communication interface 504 is configured to communicate with another device or a communication network by using any apparatus like a transceiver, for example, the Ethernet, a radio access network (RAN), or a wireless local area network (WLAN).

In a specific implementation, in an embodiment, the processor 501 may include one or more CPUs.

In a specific implementation, in an embodiment, the computer device may include a plurality of processors. Each of these processors may be a single-core (single-CPU) processor or a multi-core (multi-CPU) processor. The processor herein may be one or more devices, circuits, and/or processing cores configured to process data (for example, computer program instructions).

In an embodiment of this application, an application page development system may train a second AI model by using a plurality of second training samples to obtain a static page generation model, and train a first AI model by using a plurality of first training samples to obtain an interaction code generation model. The second AI model may be a computer vision (CV) model, and the first AI model may be a natural language processing (NLP) model. Based on this, the application page development system may identify a design draft by using the static page generation model, to generate a static page, and then generate, based on code of the static page and interaction description information input by a user, an application page having an interaction function by using an interaction code generation model. Based on this, before the application page development method provided in this embodiment of this application is described, a training process of the static page generation model and the interaction code generation model is first described.

Figure 6:
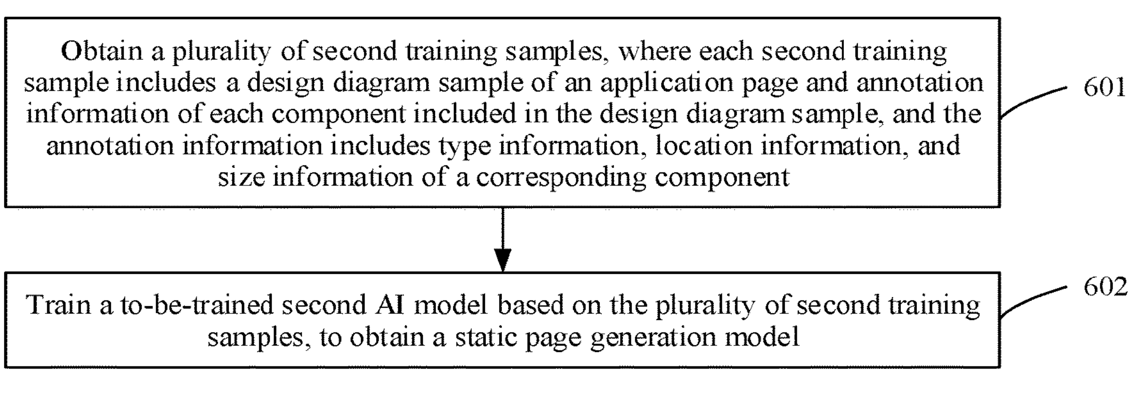
FIG. 6 is a flowchart of a method for obtaining a static page generation model according to an embodiment of this application.

FIG. 6 is a flowchart of a method for training a static page generation model according to an embodiment of this application. The method may be applied to a training apparatus in an application page development system. The application page development system is referred to as a development system for short below. Refer to FIG. 6. The method includes the following steps.

Step 601: Obtain the plurality of second training samples, where each second training sample includes a design diagram sample of an application page and annotation information of each component included in the design diagram sample, and the annotation information includes type information, location information, and size information of a corresponding component.

In this embodiment of this application, the training apparatus may obtain design diagram samples of a plurality of application pages, and annotate components included in the design diagram samples of the plurality of application pages by interacting with a user, to obtain annotation information of each design diagram sample. Then, the training apparatus may use each design diagram sample and corresponding annotation information as one second training sample, to obtain the plurality of second training samples.

For example, one of the design diagram samples of the plurality of application pages is used as an example. The training apparatus may detect a component included in the design diagram sample, to obtain type information, location information, and size information of the component, and then send such information to the user. The user may adjust such information. The training apparatus may use received information adjusted by the user as annotation information of the component.

It should be noted that the type information of the component in the annotation information indicates a type of the component. The type of the component may include a global page header, a toolbar, a drop-down list, an option button, or the like. This is not limited in embodiments of this application. The location information of the component in the annotation information indicates a location of the component in the design diagram. For example, the location information of the component may include location coordinates of an upper left corner point of the component, location coordinates of a central point of the component, and the like. The size information of the component in the annotation information may include a length, a width, and the like of the component.

Optionally, the training apparatus may directly send the design diagram samples of the plurality of application pages to the user, and then the user manually annotates a component in each design diagram sample. Then, annotation information of the component in each design diagram sample obtained through manual annotation is obtained.

Optionally, the training apparatus may directly receive a design diagram sample and corresponding annotation information that are pre-annotated by another device, that is, directly receive a second training sample sent by the another device.

Step 602: Train a to-be-trained second AI model based on the plurality of second training samples, to obtain the static page generation model.

After obtaining the plurality of second training samples, the training apparatus may sequentially input each second training sample into the second AI model, to train the second AI model, so that the static page generation model is obtained.

For example, the training apparatus inputs a design diagram sample included in one second training sample into the second AI model, and the second AI model identify the design diagram sample, to obtain component information of each component in the design diagram sample, such as type information, location information, and size information of the component. Then, the training apparatus may calculate a loss function value based on the component information of each component obtained through identification and annotation information of the corresponding component included in the training sample, and update parameters of the second AI model based on the calculated loss function value. Then, the training apparatus may continue to train, by using a next second training sample, the second AI model whose parameters are updated until the second AI model converges. The training apparatus may use the second AI model as the static page generation model.

Figure 7:
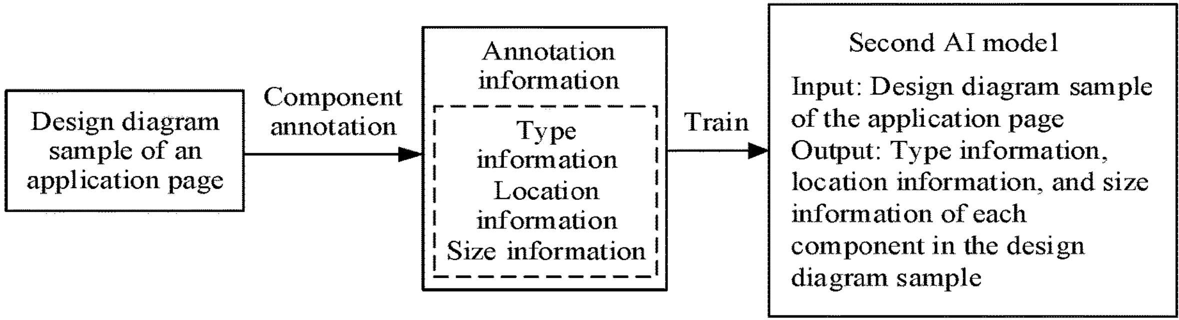
FIG. 7 is a schematic diagram of a training process of a second AI model according to an embodiment of this application.

For example, FIG. 7 is a schematic diagram of a training process of the second AI model according to an embodiment of this application. As shown in FIG. 7, the training apparatus first annotates component information in the design diagram sample of the application page, to obtain annotation information. After the annotation is completed, the training apparatus inputs the design diagram sample of the application page into the second AI model. The second AI model may identify information about a component included in the design diagram sample of the application page, and output an identification result. The training apparatus may train the second AI model based on the output identification result and the annotation information.

In this embodiment of this application, the training apparatus in the application page development system may obtain, in advance through training, the static page generation model by using a training sample that includes the design diagram sample and the annotation information of the component in the design diagram sample. Subsequently, the application page development system may generate, based on the design diagram input by the user, the static page by using the static page generation model, thereby implementing construction of a low-code or code-free static page, reducing difficulty of application page development, and improving development efficiency.

Figure 8:
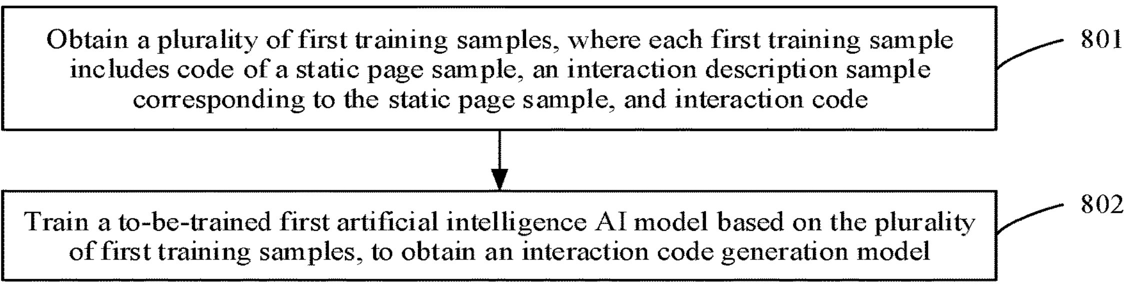
FIG. 8 is a flowchart of a method for obtaining an interaction code generation model according to an embodiment of this application.

FIG. 8 is a flowchart of a method for training an interaction code generation model according to an embodiment of this application. The method may be applied to a training apparatus in an application page development system. Refer to FIG. 8. The method includes the following steps.

Step 801: Obtain a plurality of first training samples, where each first training sample includes code of a static page sample, an interaction description sample corresponding to the static page sample, and interaction code.

In this embodiment of this application, the training apparatus may receive a plurality of first training samples sent by another device. Alternatively, a storage module of the training apparatus may store a plurality of first training samples.

It should be noted that the first training sample is used to train a to-be-trained natural language model. When the natural language model is an end-to-end language model, each first training sample may include code of a static page sample, an interaction description sample corresponding to the static page sample, and interaction code. Optionally, when the natural language model includes a slot information extraction model and a slot information conversion model, each first training sample includes code of a static page sample, an interaction description sample corresponding to the static page sample, and slot information and interaction code that are corresponding to the interaction description sample.

The interaction description sample corresponding to the static page sample describes an interaction function corresponding to at least one page component in the static page sample.

The slot information corresponding to the interaction description sample may mean information about keywords such as an interaction object and an interaction operation included in the interaction description sample. For example, the interaction description sample is "a point A in a component 1 is tapped to highlight a point B in a component 2". In this case, the slot information extracted based on the interaction description sample may include interaction operations "tap" and "highlight", and interaction objects include "the point A in the component 1" and "the point B in the component 2".

The interaction code corresponding to the interaction description sample means code used to implement an interaction function corresponding to at least one page component in the static page sample.

Step 802: Train a to-be-trained first AI model based on the plurality of first training samples, to obtain the interaction code generation model.

After obtaining the plurality of first training samples, the training apparatus may sequentially input each first training sample into the first AI model, to train the first AI model, so that the interaction code generation model is obtained.

It should be noted that when the first AI model is an end-to-end language model, the model may be a natural language model that is not pre-trained. In other words, the model has not been trained by using any data. Alternatively, the model may be a pre-trained language model that has been trained based on a large amount of code and corresponding text information. In other words, the model is a pre-trained model that can convert the text information into code. The first AI model may be a sequence to sequence (sequence to sequence, seq2seq) model, an autoregressive language model, or the like in the field of natural language processing. This is not limited in embodiments of this application. In this case, it can be learned from the foregoing descriptions that, in this case, each first training sample includes the code of the static page sample, the interaction description sample corresponding to the static page sample, and the corresponding interaction code. Based on this, the training apparatus may input code and an interaction description sample of a static page sample in a first training sample into the first AI model. The first AI model may process the code of the static page sample and the interaction description sample corresponding to the static page sample that are included in the first training sample, to output the interaction code corresponding to the interaction description sample. Then, the first AI model may calculate a loss function value based on the generated interaction code and interaction code included in the first training sample, and update parameters of the first AI model based on the loss function value obtained through calculation. Then, the training apparatus may continue to train, by using a next first training sample and with reference to the foregoing method, the model whose parameters are updated, and so on until the model is converged. The training apparatus uses the converged model as the interaction code generation model.

Figure 9:
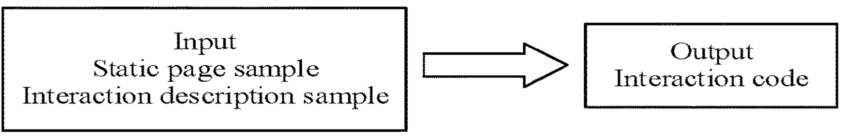
FIG. 9 is a schematic diagram of a training process of an end-to-end language model according to an embodiment of this application.

For example, FIG. 9 is a schematic diagram of a training process of an end-to-end language model according to an embodiment of this application. As shown in FIG. 9, the code of the static page sample and the interaction description sample corresponding to the static page sample are input into the end-to-end language model, and the end-to-end language model processes the code of the static page sample and the interaction description sample corresponding to the static page sample, to output the interaction code corresponding to the interaction description sample. Then, the training apparatus updates parameters of the model by comparing the output interaction code with interaction code in the training sample.

In another possible implementation, when the first AI model includes a slot information extraction model and a slot information conversion model, it can be learned from the foregoing descriptions that, in this case, each first training sample includes the code of the static page sample, the interaction description sample corresponding to the static page sample, and the interaction code and slot information that are corresponding to the interaction description sample. Based on this, the training apparatus may input an interaction description sample in a first training sample into the slot information extraction model, and the slot information extraction model extracts slot information in the interaction description sample. Then, the training apparatus may calculate a loss function value based on the extracted slot information and slot information included in the training sample, and update parameters of the slot information extraction model based on the calculated loss function value. Then, the training apparatus may continue to train, by using an interaction description sample in a next first training sample, the slot information extraction model whose parameters are updated, and so on until the slot information extraction model converges.

For example, the training apparatus may further input code and slot information that are of a static page sample in a first training sample into the slot information conversion model. The slot information conversion model may process the code and the slot information that are of the static page sample included in the first training sample, to output interaction code corresponding to the slot information. Then, the slot information conversion model may calculate a loss function value based on the generated interaction code and interaction code included in the first training sample, and update parameters of the slot information conversion model based on the loss function value obtained through calculation. Then, the training apparatus may continue to train, by using a next first training sample and with reference to the foregoing method, the slot information conversion model whose parameters are updated, and so on until the slot information conversion model is converged. The slot information conversion model may also be a seq2seq model, an autoregressive language model, or the like.

After the slot information extraction model and the slot information conversion model are trained by using the plurality of first training samples, the development system may use the two models as the interaction code generation model.

Figure 10:
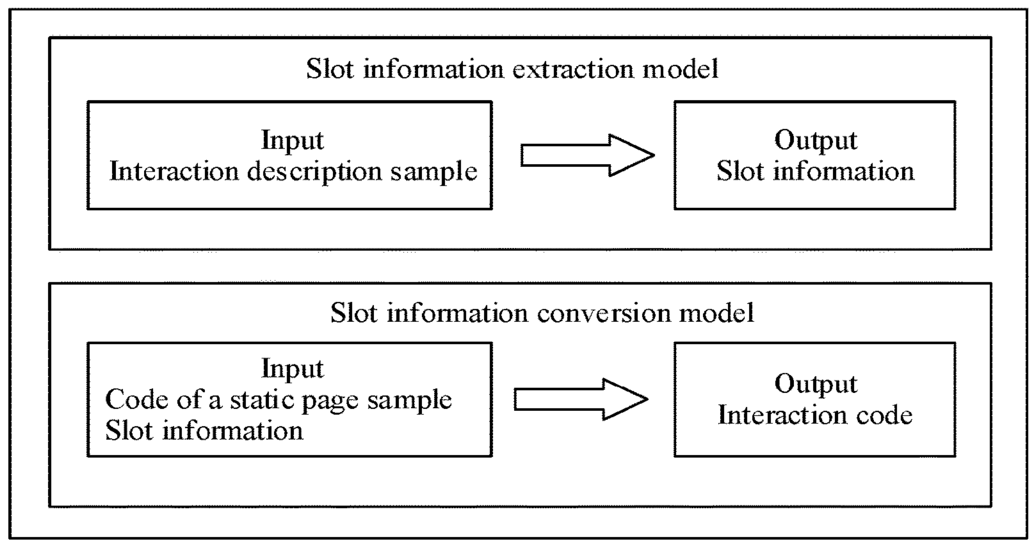
FIG. 10 is a schematic diagram of a training process of a slot information extraction model and a slot information conversion model according to an embodiment of this application.

For example, FIG. 10 is a schematic diagram of a training process of the slot information extraction model and the slot information conversion model according to an embodiment of this application. As shown in FIG. 10, the slot information extraction model is first trained by using the interaction description sample corresponding to the static page sample. The interaction description sample corresponding to the static page sample is input into the slot information extraction model, and the slot information extraction model extracts and outputs slot information in the interaction description sample. The training apparatus may train the slot information extraction model based on the output slot information and the slot information corresponding to the interaction description sample included in the training sample. In addition, the training apparatus further trains the slot information conversion model by using the code and the slot information that are of the static page sample in the first training sample, and inputs the code and the slot information that are of the static page sample into the slot information conversion model. The slot information conversion model generates interaction code corresponding to the slot information based on the code and the slot information that are of the static page sample, to update parameters of the slot information conversion model based on the output interaction code and interaction code included in the first training sample. After the two models are trained, the development system can use the two models as the interaction code generation model.

In this embodiment of this application, the training apparatus in the application page development system may obtain, in advance through training, the interaction code generation model that can convert the interaction description information into the interaction code by using a training sample. Subsequently, the application page development system may generate, by using the interaction code generation model, corresponding interaction code based on the interaction description information input by the user, to construct an interactive dynamic application page based on the interaction code, without a need for the user to write the interaction code. This helps implement construction of a low-code dynamic page, reduce difficulty of application page development, and improve development efficiency.

Figure 11:
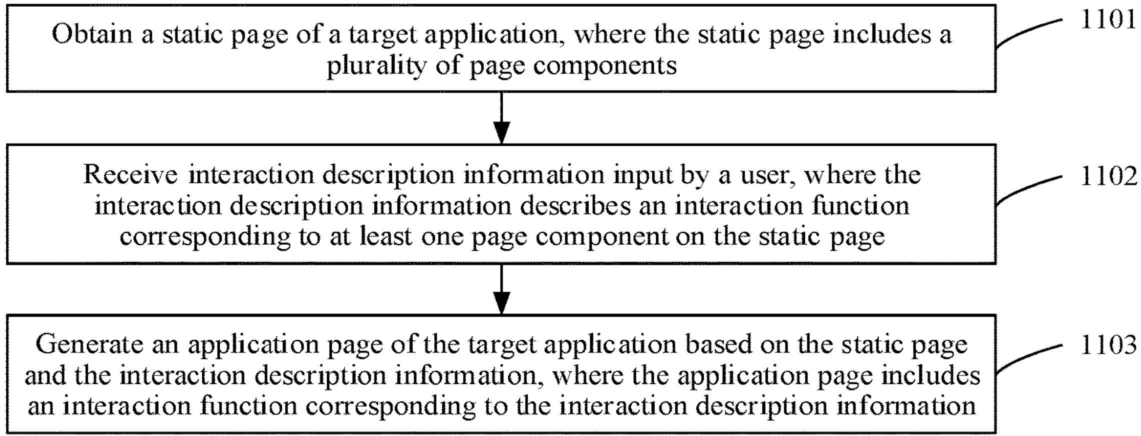
FIG. 11 is a flowchart of an application page development method according to an embodiment of this application.

FIG. 11 is a flowchart of an application page development method according to an embodiment of this application. The method may be applied to the application page development system described above. Refer to FIG. 11, the method includes the following steps.

Step 1101: Obtain a static page of a target application, where the static page includes a plurality of page components.

In this embodiment of this application, the development system obtains a design diagram of an application page of the target application, and then identifies the design diagram based on a static page generation model, to obtain intermediate codes. The intermediate code includes component information of a page component that is obtained from the design diagram through identification. Then, the development system may generate the static page of the target application based on the obtained intermediate codes.

In a possible implementation, the development system may receive a design diagram that is of the application page of the target application and that is drawn by a user in real time. For example, the development system may provide a drawing interface for the user, and the user may draw a draft design diagram of the application page of the target application on the drawing interface by using an external paintbrush device or a mouse. A drawing tool set may be further displayed on the drawing interface. The drawing tool set may include a plurality of drawing tools such as "Cancel", "Redo", "Paintbrush", "Erase", "Clear", and "Full Screen". The user may modify the draft design diagram by using a drawing tool in the drawing tool set. After the user draws the draft design diagram of the application page of the target application, the development system may display the draft design diagram, so that the user determines whether to use the draft design diagram as the design diagram of the application page of the target application. After the user determines to use the draft design diagram as the design diagram of the application page of the target application, the development system may store the design diagram for subsequent use.

In another possible implementation, the development system may receive a design diagram that is of the application page of the target application and that is sent by a user by using another device or system, or the development system stores a plurality of design diagrams, and a user may directly select the design diagram of the application page of the target application from the design diagrams stored in the development system. Correspondingly, the development system may display the design diagram that is of the application page of the target application and that is sent by the user by using the another device or that is selected locally.

After obtaining the design diagram of the application page of the target application, the development system may identify the design diagram of the application page of the target application based on the static page generation model obtained through training in the foregoing embodiment, to obtain one or more groups of intermediate codes.

It can be learned from the foregoing descriptions that a second training sample used when the static page generation model is trained includes a design diagram sample of the application page and annotation information of each component included in the design diagram sample. Therefore, the static page generation model trained based on the second training sample may identify each component included in the design diagram. Based on this, the development system may input the design diagram of the application page of the target application into the static page generation model. The static page generation model identifies the design diagram of the application page of the target application, to obtain one or more identification results. One identification result includes a group of intermediate codes, and each group of intermediate codes may include component information that is obtained through identification from the design diagram and that can describe a page component in the design diagram.

For example, the component information may include one or more of type information, location information, size information, and a nesting relationship of the component. The type information of the component indicates a type of the component, and the type of the component may include a text, a drop-down list, a rank chart, a bar graph, and the like.

The location information of the component indicates a location of the component in the design diagram. For example, the location information of the component may include location coordinates of an upper left corner point of the component, location coordinates of a central point of the component, and the like.

The size information of the component may include a length, a width, and the like of the component.

The nesting relationship of the component can be used for relationships between different components. The nesting relationship of the component may be recorded in a tree structure. For example, when the design diagram of the application page includes a global page header, and the global page header further includes one icon, the nesting relationship may indicate that a global page header component includes one icon component.

After obtaining the one or more groups of intermediate codes, the development system may generate a static candidate page corresponding to each group of intermediate codes, and then generate the static page of the target application based on the generated static candidate page.

A group of intermediate codes is used as an example. The development system may obtain, from a component library based on type information of each component in the intermediate codes, component code corresponding to each component. The component code corresponding to each component includes an attribute value configuration item. Then, the development system may use location information and size information of each component included in the intermediate codes as an attribute value of the corresponding attribute value configuration item in the corresponding component code, to obtain code of a static candidate page corresponding to the intermediate codes. Then, the development system may generate, based on the code of the static candidate page, the static candidate page corresponding to the intermediate codes.

The code of the static candidate page may be static hypertext markup language (HTML) code, JavaScript code, or the like. This is not limited in embodiments of this application.

Figure 12:
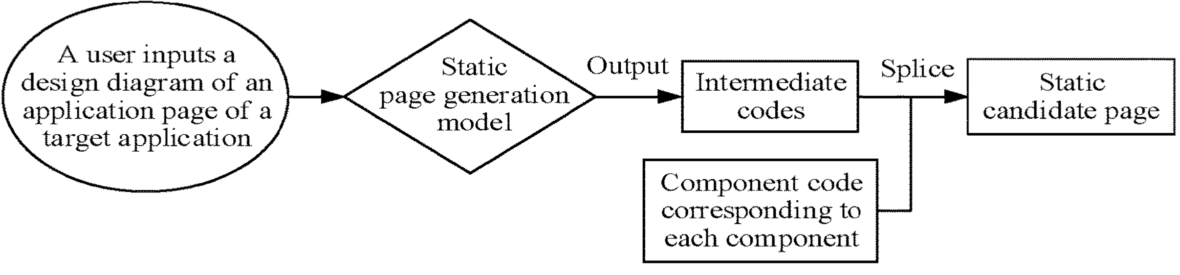
FIG. 12 is a flowchart of a method for generating a static page according to an embodiment of this application.

For example, FIG. 12 is a flowchart of a method for generating a static page according to an embodiment of this application. As shown in FIG. 12, the user inputs the design diagram of the application page of the target application into the development system. After receiving the design diagram of the target application, the development system identifies the design diagram based on the static page generation model, to obtain intermediate codes. Then, the development system obtains, from the component library based on the type information of each component in the intermediate codes, the component code corresponding to each component, and splices code of each component included in the page based on the intermediate codes, to obtain code of a static page corresponding to the intermediate codes, and then generates the corresponding static page based on the code of the static page.

It should be noted that, if the development system identifies a group of intermediate codes, one static candidate page is obtained by using the foregoing method. In this case, the development system may directly use the static candidate page as the static page of the target application. Alternatively, the development system may display the static candidate page on an interaction optimization interface, and then the user may perform an adjustment operation on the static candidate page. The development system may adjust the static candidate page based on the adjustment operation performed by the user, to obtain the static page of the target application. The adjustment operation performed by the user on the static candidate page may include at least one of: an operation of adding a component, an operation of deleting a component, and an operation of modifying a component in the static candidate page. The operation of modifying a component includes modifying a location, a style, and a size of the component, data bound to the component, and the like.

For example, the interaction optimization interface displayed by the development system may include a component tool set, and the component tool set includes various different types of components. Based on this, the user may drag a to-be-added component in the component tool set to the static candidate page to add the component, drag a to-be-deleted component out from the static candidate page or perform another deletion operation to delete the component, drag a component on the static candidate page to modify a location of the component, and drag a border of the component on the static candidate page to modify a size or a style of the component. Alternatively, when displaying the static candidate page, the interaction optimization interface may further display the code of the static candidate page. In this way, the user may further adjust a component in the code by performing quantized configuration on an attribute value of the component. This is not limited in embodiments of this application. After the user adjusts the static candidate page, the development system may use the adjusted static candidate page confirmed by the user as the static page of the target application.

It should be noted that, in this embodiment of this application, when the development system receives the adjustment operation performed by the user and adjusts the component on the static candidate page based on the adjustment operation, the code of the static candidate page is synchronously updated based on the adjustment operation. For example, when the user adds a component to the static candidate surface, code of the component is also synchronously added to the code of the static candidate page. In addition, the development system may synchronously update the currently displayed static candidate page based on adjusted code of the static candidate page, and highlight updated code in the code of the displayed static candidate page, so that the user can conveniently view adjustment effect and updated part of code.

Optionally, if the development system identifies a plurality of groups of intermediate codes, a static candidate page corresponding to each group of intermediate codes can be obtained by using the foregoing method, that is, a plurality of static candidate pages are obtained. In this case, the development system may display the plurality of static candidate pages to the user, and the user may select one static candidate page from the plurality of static candidate pages. In this way, the development system may use, based on a selection operation performed by the user, the static candidate page selected by the user as a first static candidate page, and display the first static candidate page on the interaction optimization interface. Then, the development system may adjust the first static candidate page based on the adjustment operation performed by the user, to obtain the static page of the target application. For a method for adjusting the first static candidate page based on the adjustment operation performed by the user, refer to the foregoing described method for performing the adjustment operation on the static candidate page. Details are not described in this embodiment of this application again.

Optionally, after the user selects one static candidate page from the plurality of static candidate pages, the development system may directly use, based on the selection operation performed by the user, the static candidate page selected by the user as the static page of the target application.

The above mainly describes the method in which the development system identifies the design diagram by using the static page generation model, and generates the static page based on the identification result. Optionally, the development system may alternatively obtain the static page in another manner. For example, the development system may obtain, from another device or system, pre-generated code of a static candidate page of the target application, and display the static candidate page based on the code of the static candidate page, so that the user performs selection and adjusts the selected page, to obtain the static page of the target application.

Step 1102: Receive interaction description information input by the user, where the interaction description information describes an interaction function corresponding to at least one page component on the static page.

After obtaining the static page of the target application, the user may input, according to an interaction function requirement of the user for the static page, an interaction description language describing the interaction function corresponding to the at least one page component on the static page. The interaction description information may be at least one of voice information and text information.

For example, in a possible implementation, the development system may be connected to a pickup apparatus or have a built-in pickup apparatus. In this case, the development system may receive voice information that is collected by the pickup apparatus and that is used by the user to describe the interaction function corresponding to the at least one page component in the static page, and use the voice information as the interaction description information input by the user.

Optionally, when receiving the voice information, the development system may further identify the received voice information in real time, to obtain a voice identification result. Then, the development system may display the obtained voice identification result on a display interface in real time. The user may determine whether the voice identification result displayed on the display interface is consistent with voice information input by the user. If the voice identification result is consistent with the voice information input by the user, the voice identification result is used as the interaction description information. If the voice identification result is not consistent with the voice information input by the user, the user may modify the voice identification result. Correspondingly, the development system may use the voice identification result modified by the user as the interaction description information input by the user.

In some other possible implementations, the development system may alternatively directly display a text input interface. In this way, the user may directly input text information into the text input interface to describe the interaction function corresponding to the at least one page component on the static page. Correspondingly, the development system obtains the text information input by the user, and uses the text information as the interaction description information of the static page.

Step 1103: Generate the application page of the target application based on the static page and the interaction description information, where the application page includes an interaction function corresponding to the interaction description information.

After obtaining the static page and the interaction description information, the development system may generate interaction code corresponding to the interaction description information based on the static page and the interaction description information, and further generate the application page of the target application based on the static page and the interaction code.

In a possible implementation, the development system may generate the interaction code corresponding to the interaction description information based on an interaction code generation model.

When the interaction code generation model is an end-to-end model obtained through training by the training apparatus described in the foregoing embodiment, the development system may input the obtained interaction description information and the obtained code of the static page of the target application into the interaction code generation model. The interaction code generation model may process the code of the static page and the interaction description information, to output the interaction code corresponding to the interaction description information.

Optionally, when the interaction code generation model includes a slot information extraction model and a slot information conversion model, the development system may input the interaction description information into the slot information extraction model, and the slot information extraction model extracts slot information in the interaction description information. Then, the extracted slot information and the code of the static page are input into the slot information conversion model to process the code of the static page and the slot information, to output the interaction code corresponding to the interaction description information.

In another possible implementation, the development system may extract the slot information in the interaction description information based on the slot information extraction model. Then, interaction code corresponding to the slot information is obtained according to a preset rule, and the obtained code of the slot information is spliced, to obtain the interaction code corresponding to the interaction description information. That the interaction code corresponding to the slot information is obtained according to the preset rule may be that the interaction code corresponding to the slot information is obtained from an interaction code library or is obtained in another manner. This is not limited in embodiments of this application.

After obtaining the interaction code corresponding to the interaction description information, the development system fuses the code of the static page of the target application and the interaction code, to obtain code of a candidate application page. Then, the application page of the target application is generated based on the code of the candidate application page.

It can be learned from the foregoing descriptions that the code of the static page of the target application includes code of a component in the static page of the target application. The code of the component may include at least one editable interaction interface corresponding to the corresponding component. Based on this, the development system may write, into an interaction interface of a corresponding page component, interaction code corresponding to the interaction function corresponding to the at least one page component on the static page of the target application, to obtain the code of the candidate application page.

After obtaining the code of the candidate application page, the development system may directly use the code of the candidate application page as final code, to generate and display the application page of the target application based on the code.

Alternatively, the development system may display the candidate application page on the interaction optimization interface based on the code of the candidate application page, and adjust the candidate application page based on an interaction function editing operation performed by the user, to obtain the application page of the target application.

In a first possible implementation, the interaction function editing operation performed by the user on the candidate application page may be implemented by dragging a target interaction tool in a plurality of interaction tools displayed on the interaction optimization interface to a component. In this implementation, an interface tool set may be displayed on the interaction optimization interface. The interface tool set may include a plurality of interaction tools, each interaction tool indicates an interaction function, and each interaction tool is corresponding to code used to implement a corresponding interaction function. The development system adds, to the code of the candidate application page based on the drag operation performed by the user on the target interaction tool, code corresponding to the interaction function indicated by the target interaction tool, to display the application page of the target application based on updated code. The target interaction tool means an interaction tool corresponding to an interaction function that the user is interested in.

For example, the user may perform a drag operation on the target interaction tool displayed on the interaction optimization interface, to drag the target interaction tool to a target page component on the candidate application page. The target page component means a component to which the user needs to add an interaction function indicated by the target interaction tool. It should be noted that each of the plurality of interaction tools may be used in one or more components. In other words, interaction tools that can be used by each component on the page are different. In other words, there is a mapping relationship between an interaction tool and a component. For example, an interaction tool 1 may be used in a component 1, a component 2, and a component 3, and an interaction tool 2 may be used in the component 2, the component 3, and a component 4. Based on this, the user may drag, based on the mapping relationship between the interaction tool and the component, the target interaction tool to a target component that can use the interaction tool and that the user is interested in. After receiving the drag operation performed by the user on the target interaction tool, the development system may add, to an interaction interface corresponding to code of the target page component in the code of the candidate application page, the code corresponding to the interaction function indicated by the target interaction tool dragged by the user, and then generate an updated candidate application page based on updated code of the candidate application page, and display the updated candidate application page on the interaction optimization interface for the user to view. After receiving a confirmation operation performed by the user on the updated candidate application page, the development system uses the updated candidate application page as the application page of the target application and displays the updated candidate application page. Alternatively, the user may adjust the displayed candidate application page. After the user performs a confirmation operation on the candidate page displayed on the interaction optimization interface, the development system uses the candidate application page finally confirmed by the user as the application page of the target application. For a manner of adjusting the candidate application page, refer to the foregoing described adjustment method. Details are not described in this embodiment of this application again.

Figure 13:
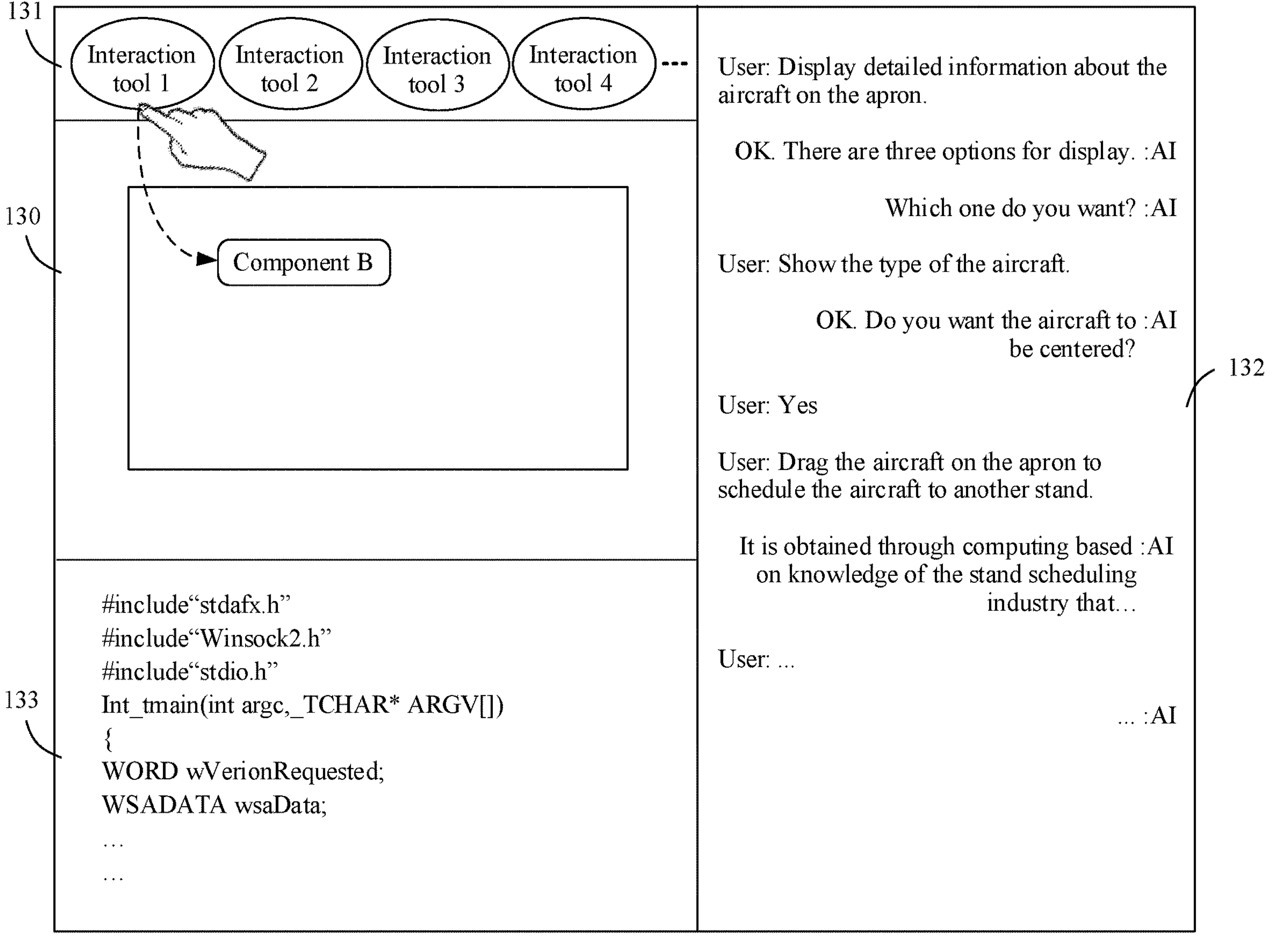
FIG. 13 is a schematic diagram of an interaction optimization interface according to an embodiment of this application.

For example, FIG. 13 is a schematic diagram of an interaction optimization interface according to an embodiment of this application. As shown in FIG. 13, the interaction optimization interface includes a page display area 130 and a toolbar 131. A candidate application page is displayed in the page display area 130, and an interface tool set 1311 is displayed in the toolbar 131. When the user wants to add an interaction function corresponding to an interaction tool 1 in the interface tool set to a corresponding component B, as shown in FIG. 13, the user may drag the interaction tool 1 to a location of the component B.

Optionally, an interaction function editing operation performed by the user on two or more component pairs on the candidate application page may be implemented by performing a visual interaction operation such as dragging and connecting an interaction function of every two components.

For example, an interaction function supported by each component on the candidate application page may be explicitly displayed on the interface. The user may perform, on the interface, the visual interaction operation such as dragging and connecting the interaction function of every two components, to perform interaction editing, optimization, and construction between components. Similarly, interaction tools and components are in a many-to-many mapping relationship. When a corresponding interaction behavior may occur between two components, the user may construct and adjust the interaction behavior between a component pair by connecting or dragging.

Figure 14:
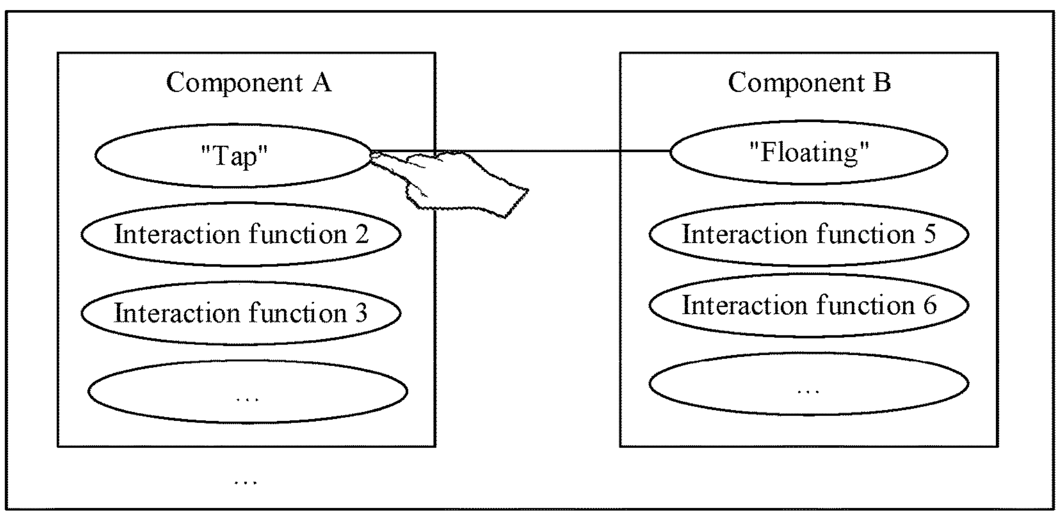
FIG. 14 is a schematic diagram of an interaction function of an editing component pair according to an embodiment of this application.

For example, FIG. 14 is a schematic diagram of an interaction function editing operation between a component pair according to an embodiment of this application. As shown in FIG. 14, a component A and a component B of the candidate application page are displayed on the interaction optimization interface. Certainly, there may be another component. This is not limited in embodiments of this application. The component A supports interaction functions such as "tap", an interaction function 2, and an interaction function 3. The component B supports "floating", an interaction function 5, an interaction function 6, and the like. When the component A is tapped, the component B may be "floating". In this case, the user can drag and connect "tap" in component A and "floating" in component B on the interaction optimization interface to edit an interaction function between the two components. It should be noted that FIG. 14 shows an example operation, and does not constitute a limitation on embodiments of this application.

In a second possible implementation, an AI dialog model is deployed in the development system, and the interaction function editing operation performed by the user on the candidate application page may alternatively be implemented by using the AI dialog model. In this case, the development system may interact with the user by using the AI dialog model, to obtain interaction function editing information of the candidate application page; perform knowledge computing by using the interaction function editing information and an industry knowledge graph; recommend a modification suggestion to the user by using the AI dialog model, to inspire the user to further complete and optimize interaction construction; and when receiving a confirmation operation performed by the user on the modification suggestion, update the code of the candidate application page based on the interaction function editing information and the modification suggestion, and then display the application page of the target application based on updated code.

For example, the development system may display, on the interaction optimization interface, a dialog interface on which interaction is performed with the AI dialog model. The user may input a voice instruction or a text instruction into the dialog interface. The AI dialog model may provide corresponding information for the user based on the candidate application page and the voice instruction or the text instruction input by the user, and display the information on the dialog interface. Inspired by the information provided by the AI dialog model, the user may input, into the dialog interface, interaction function editing information in a form of voice or text. The AI dialog model performs knowledge computing based on the interaction function editing information and the industry knowledge graph, and outputs a modification suggestion for the interaction function editing information. The development system displays the modification suggestion on the dialog interface. The user may confirm, based on the modification suggestion recommended by the AI dialog model, whether to accept the modification suggestion. If the user confirms the modification suggestion, the development system may update, based on the modification suggestion, the interaction function editing information input by the user, and then update the code of the candidate application page based on updated interaction function editing information, to generate the application page of the target application based on updated code. The development system may generate corresponding interaction code based on the updated interaction function editing information by using the foregoing method in which the interaction code generation model is used or in another manner, and then modify corresponding code in the code of the candidate application page to updated interaction code, to obtain the updated code.

It should be noted that the user may perform a plurality of rounds of interaction with the AI dialog model. To be specific, the AI dialog model may perform knowledge computing based on the industry knowledge graph, and continuously provide inspiring suggestions to the user. The user may continuously provide different interaction function editing information based on the inspiring suggestions provided by the AI dialog model, so that the user and the AI dialog model obtain final interaction function editing information under continuous inspiration, to adjust the interaction function of the candidate application page, so that the application page of the target application is obtained.

For example, as shown in FIG. 13, the interaction optimization interface includes a dialog interface 132 and a code display area 133 used to display the code of the candidate application page. The code displayed in FIG. 13 is merely example code, and does not constitute a limitation on embodiments of this application. It should be noted that, when the user inputs "Display detailed information about the aircraft on the apron" on the dialog interface 132, the AI dialog model may output "OK. There are three options for display. Which one do you want?", and then the user may choose one of the three options based on a suggestion of the AI model. Optionally, the user may further input interaction function editing information of "Drag the aircraft on the apron to schedule the aircraft to another stand" into the dialog interface. The AI dialog model may perform knowledge computing based on the interaction function editing information input by the user and with reference to the industry knowledge graph, and outputs a modification suggestion of "It is obtained through computing based on knowledge of the stand scheduling industry that the Gantt chart also encodes the relationship between aircrafts and stands. You are advised to adjust linkage interaction synchronously. Do you want to adjust the linkage interaction?" Then, the user may input further information based on the modification suggestion recommended by the AI model. In this way, the user and the AI dialog model complete adjustment of the candidate application page through the plurality of rounds of interaction.

In a third possible implementation, the interaction function editing operation performed by the user on the candidate application page may alternatively be implemented by modifying the code of the candidate application page. In this case, the development system may display the code of the candidate application page on the interaction optimization interface, update the code of the candidate application page based on a modification operation performed by the user on the code of the candidate application page, and display the application page of the target application based on updated code.

For example, the user may modify the code of the candidate application page displayed on the interaction optimization interface. For example, the user may add code, delete code, or rewrite code in the code of the candidate application page displayed in the code display area 133 shown in FIG. 13. After receiving the modification operation performed by the user on the code of the candidate application page, the development system may update the code of the candidate application page based on the modification operation performed by the user on the code of the candidate application page, and display an updated candidate application page on the interaction optimization interface in real time based on the updated code, so that the user determines whether to continue modification until the development system receives a modification confirmation operation performed by the user. At this time, the development system generates and displays the application page of the target application based on finally modified code.

It can be learned from the foregoing descriptions that when the user adjusts the interaction function of the candidate application page on the interaction optimization interface, the code of the candidate application page changes synchronously. Based on this, if the code of the candidate application page is further displayed on the interaction optimization interface, the development system may synchronously refresh the displayed code of the candidate application page, that is, synchronously display the updated code of the candidate application page, and an updated part in the code may be highlighted. For example, a color of the updated part in the updated code may be set to be highlighted for inspection and further modification by the user.

It should be noted that the foregoing three manners of adjusting the interaction function of the candidate application page may also be used in combination, and the interaction function may be adjusted in another manner. This is not limited in embodiments of this application.

In addition, in some possible cases, when the development system converts interaction description information into interaction code, a plurality of conversion results may be alternatively obtained, and each conversion result includes a group of interaction codes. In this case, when the candidate application page is generated based on the interaction code, a plurality of candidate application pages are obtained. In this case, the development system may display the plurality of candidate application pages to the user, and the user may select one candidate application page from the plurality of candidate application pages. Then, the development system may generate the application page of the target application with reference to the foregoing described implementations based on the candidate application page selected by the user. Details are not described in this embodiment of this application again.

Optionally, in this embodiment of this application, after obtaining the application page of the target application, the user may alternatively perform a page preview operation. After receiving the page preview operation, the development system may display preview effect of the application page. For example, if the application page is a web page, the development system may display the application page in a browser.

Optionally, in this embodiment of this application, after obtaining the application page of the target application, the user may alternatively perform a code export operation. After receiving the code export operation, the development system may store the code of the application page of the target application as a file, so that the user can directly use the file or use the file for subsequent development.

In this embodiment of this application, the static page of the target application may be first obtained, and then the application page including the interaction function corresponding to the interaction description information is generated based on the interaction description information input by the user and the static page. In other words, the application page has a function of interacting with the user. It can be learned that, in this embodiment of this application, construction of a low-code interactive application page is implemented, which is convenient and efficient.

In addition, in this embodiment of this application, the design diagram that is of the application page of the target application and that is input by the user may be obtained, and a dynamic interaction page may be generated based on the design diagram input by the user and the interaction description information input by the user, so that a full link from requirement to design to page development is streamlined.

Third, in this embodiment of this application, one candidate application page may be alternatively generated by using the static page generation model and the interaction code generation model, and then a plurality of rounds of iteration are performed by using the AI dialog model to obtain an inspiring suggestion, to adjust the candidate application page, and finally complete construction of the application page of the target application. In an entire process, human-machine interaction intelligent page construction is implemented, and construction of a low-code or code-free application page is implemented, without a need for the user to write code.

Figure 15:
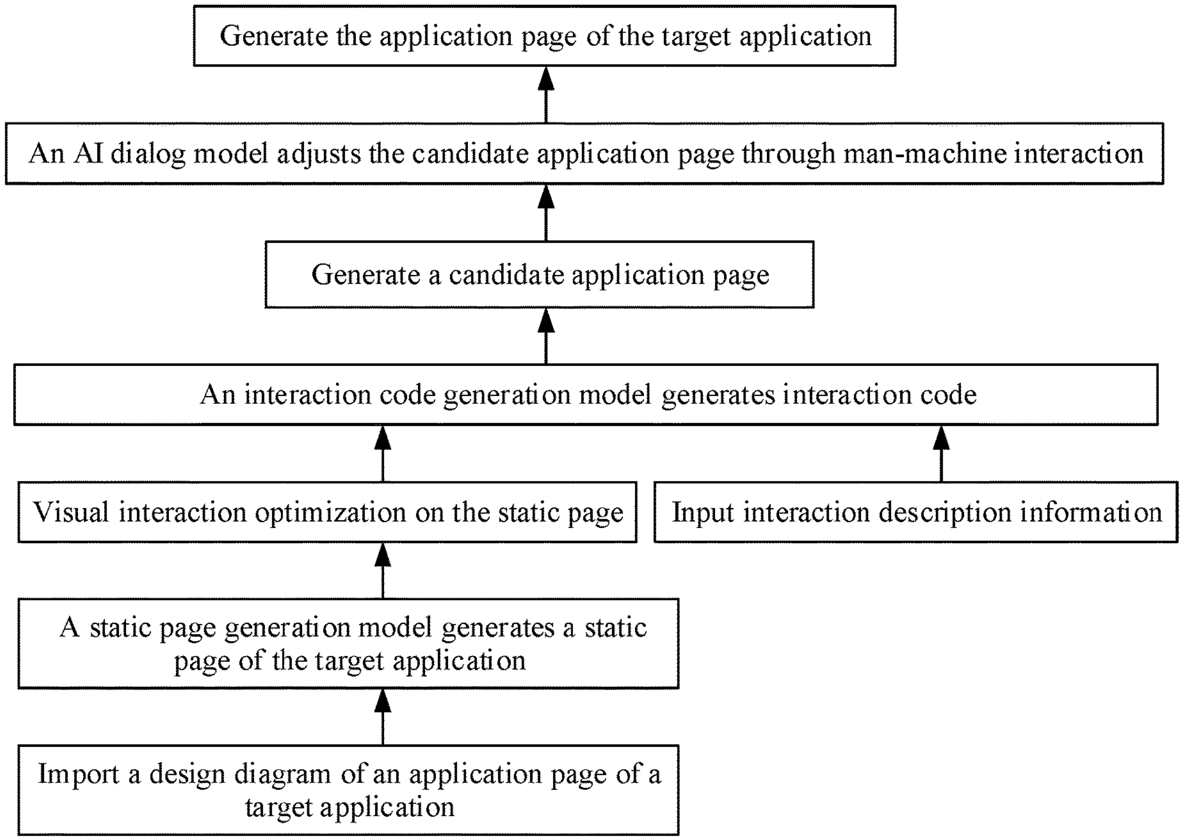
FIG. 15 is a flowchart of another application page development method according to an embodiment of this application.

Based on the application page development method provided above, FIG. 15 is an example flowchart of application page development. As shown in FIG. 15, first, the user may import the design diagram of the application page of the target application into the development system. After receiving the design diagram that is of the application page of the target application and that is imported by the user, the development system may generate a static page of the target application by using the static page generation model. For a manner of generating the static page of the target application, refer to the foregoing step 1101. Details are not described in this embodiment of this application again. After the static page of the target application is generated, the static page is displayed on the interaction optimization interface, so that the user performs visual interaction optimization on the static page. For a method for optimizing the static page, refer to the related implementation in the foregoing step 1101. Details are not described in this embodiment of this application again. After the static page is adjusted, the development system receives interaction description information that is input by the user and that is of the interaction function corresponding to the at least one page component on the static page, and generates, by using the interaction code generation model and based on optimized static page and the interaction description information, interaction code corresponding to the interaction description information. For a manner of generating the interaction code, refer to the foregoing step 1103. Details are not described in this embodiment of this application again. After the interaction code is generated, the development system fuses code of the static page of the target application and the interaction code, to obtain code of a candidate application page. Then, the development system generates the candidate application page based on the code of the candidate application page, and adjusts the candidate application page by performing human-machine interaction by using the AI dialog model. Through a plurality of rounds of iterative construction, the user is inspired to further optimize and finally complete interaction construction, to generate the application page of the target application. For a method for performing the interaction construction by using the AI dialog model, refer to the foregoing step 1103. Details are not described in this embodiment of this application again.

Figure 16A:
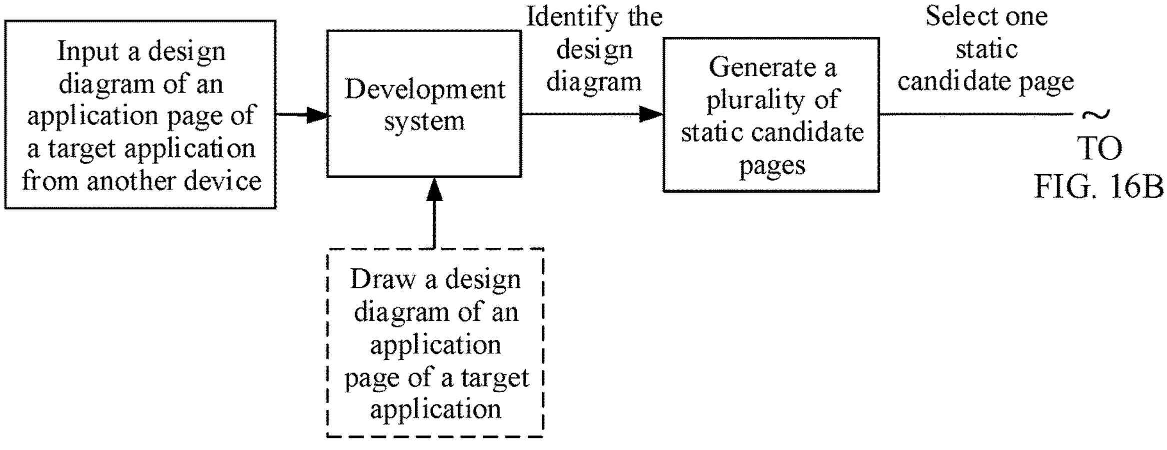
FIG. 16A to FIG. 16C are a flowchart of still another application page development method according to an embodiment of this application.
Figure 16B:
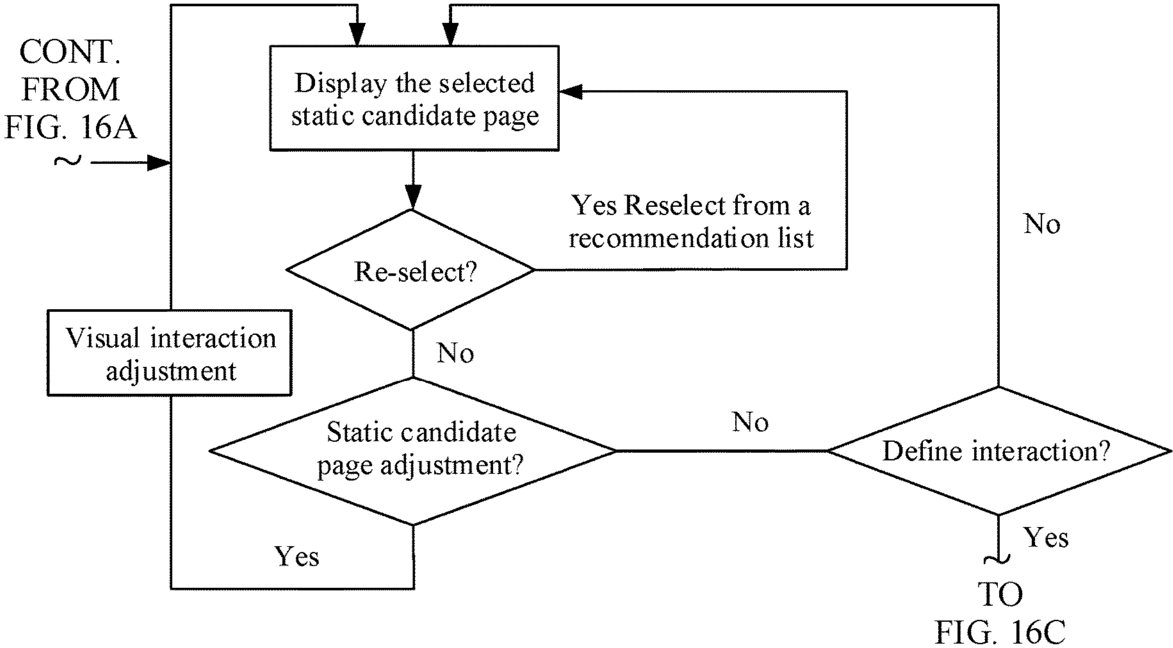
Figure 16C:
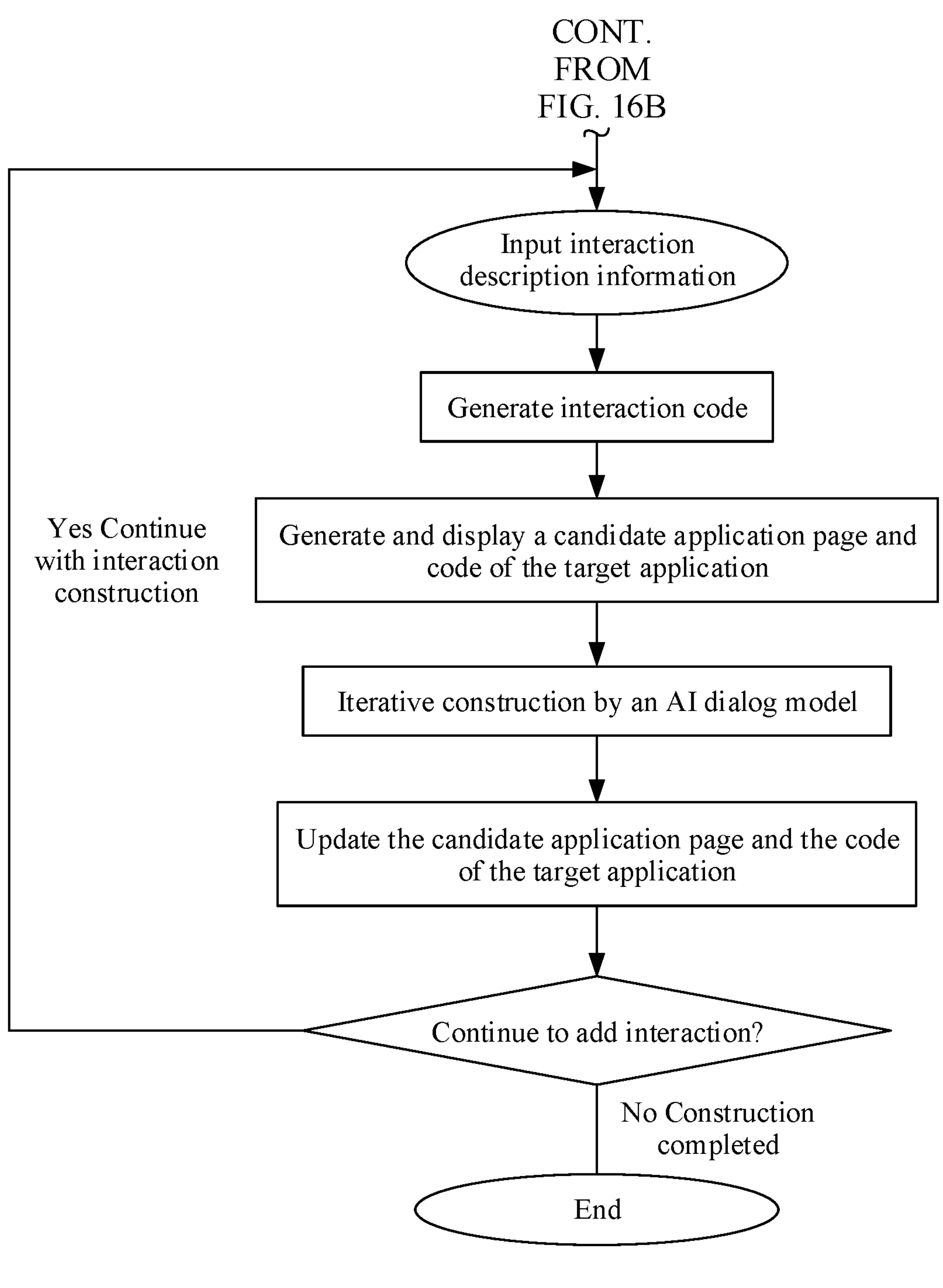

FIG. 16A to FIG. 16C are an example flowchart of another application page development method according to an embodiment of this application. As shown in FIG. 16A to FIG. 16C, the user first inputs the design diagram of the application page of the target application into the development system. The user may import the design diagram of the target application by using another device, or draw the design diagram of the application page of the target application in real time by using a drawing interface provided by the development system. For a specific implementation, refer to the foregoing step 1101. Details are not described in this embodiment of this application again. After receiving the design diagram that is of the application page of the target application and that is imported by the user, the development system identifies the design diagram of the application page of the target application by using the static page generation model, and generates a plurality of static candidate pages based on an identification result. In this way, the development system may select one of the static candidate pages for presentation to the user, and the user may select the static candidate page and determine whether to perform visual interaction adjustment on the static page, to obtain the static page of the target application. Alternatively, the user may reselect a static candidate page from the plurality of generated static candidate pages, and determine whether to perform visual interaction adjustment on the static page, to obtain the static page of the target application. For a method for generating the plurality of static candidate application pages based on identification of the design diagram and adjusting the static candidate page, refer to the foregoing step 1101. Details are not described in this embodiment of this application again. After obtaining the static page of the target application, the development system may display the static page to the user. After displaying the static page of the target application to the user, the development system may further receive interaction description information that is of the static page and that is input by the user. For a method for inputting the interaction description information by the user, refer to the foregoing step 1102. Details are not described in this embodiment of this application again. After receiving the interaction description information input by the user, the development system may generate interaction code corresponding to the interaction description information by using the interaction code generation model. For a specific method for generating the interaction code by using the interaction code generation model, refer to the foregoing step 1103. Details are not described in this embodiment of this application again. After the interaction code is generated, the code of the static page and the interaction code may be fused to obtain code of a candidate application page, to obtain the candidate application page, and display the candidate application page to the user. Then, a plurality of rounds of interaction are performed with the user by using the AI dialog model, to inspire the user to further optimize the candidate application page, so as to update the candidate application page of the target application and the code corresponding to the candidate application page, and display the candidate application page to the user. The user may choose to complete construction, and use the candidate application page as the application page of the target application. Alternatively, the user may choose to continue to add an interaction function to the candidate application page, and continue to perform interaction construction until the application page of the target application is finally generated. For a method for generating the application page of the target application, refer to the foregoing step 1103. Details are not described in this embodiment of this application again.

Embodiments of this application further provide a page generation apparatus 11 shown in FIG. 1. Modules and functions included in the apparatus are described above. Details are not described herein again.

In some embodiments, a static page obtaining module 111 in the page generation apparatus 11 is configured to perform step 1101 in the foregoing embodiment. An application page generation module 112 is configured to perform step 1103 in the foregoing embodiment, and an interaction module 113 is configured to perform step 1102 in the foregoing embodiment.

This application further provides a training apparatus 12 shown in FIG. 1. Modules and functions included in the training apparatus 12 are described above. Details are not described herein again.

Embodiments of this application further provide a computing device 500 shown in FIG. 5. A processor 501 in the computing device 500 reads a set of computer instructions stored in a memory 503 to perform the foregoing application page development method.

Figure 17:
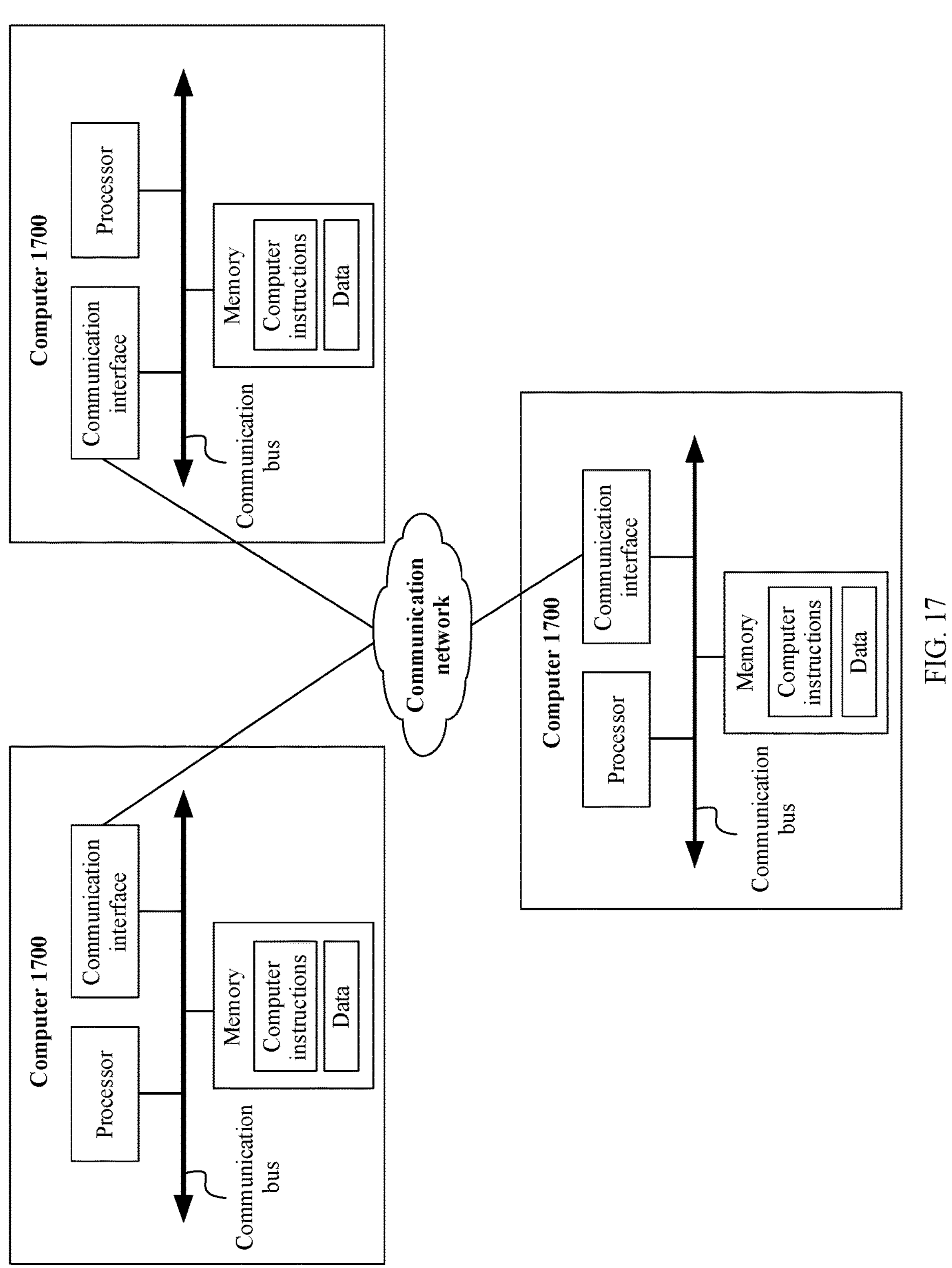
FIG. 17 is a schematic diagram of a structure of a computer system according to an embodiment of this application.

The modules in the page generation apparatus 11 and the training apparatus 12 provided in embodiments of this application may be deployed on a plurality of computers in a same environment or in different environments in a distributed manner. Therefore, this application further provides a computing device (which may also be referred to as a computer system) shown in FIG. 17. The computer system includes a plurality of computers 1700. A structure of each computer 1700 is the same as or similar to a structure of the computing device 500 in FIG. 5. Details are not described herein again.

A communication path is established between the computers 1700 by using a communication network. Any one or more of the static page obtaining module 111, the application page generation module 112, the interaction module 113, the training module 121, and a storage module 122 run on each computer 1700. Any computer 1700 may be a computer (for example, a server) in a cloud data center, an edge computer, or a terminal computing device.

The descriptions of procedures corresponding to the foregoing accompanying drawings have respective focuses. For a part of a procedure that is not described in detail, refer to related descriptions of another procedure.

All or some of the foregoing embodiments may be implemented by software, hardware, firmware, or any combination thereof. When software is used to implement embodiments, all or some of embodiments may be implemented in a form of computer program product. A computer program product for implementing application page development includes one or more computer instructions for application page development. When these computer program instructions are loaded and executed on a computer, procedures or functions according to FIG. 6 to FIG. 16A to FIG. 16C in embodiments of this application are all or partially generated.

The computer may be a general-purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a website, a computer, a server or a data center to another website, computer, server or data center in a wired (for example, a coaxial cable, an optical fiber, a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk drive, or a tape), an optical medium (for example, a digital versatile disc (DVD)), or a semi-conductive medium (for example, a solid-state disk (SSD)).

It should be understood that "at least one" mentioned in this specification means one or more, and "a plurality of" means two or more. In description of this specification, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, to clearly describe technical solutions in embodiments of this application, words such as "first" and "second" are used in embodiments of this application to distinguish between identical items or similar items that have basically the same functions or purposes. A person skilled in the art may understand that the words such as "first" and "second" do not limit a quantity and an execution sequence, and that the words such as "first" and "second" do not indicate a definite difference.

A person of ordinary skill in the art may understand that all or some of the steps of embodiments may be implemented by hardware or a program instructing related hardware. The program may be stored in a computer-readable storage medium. The storage medium may be a read-only memory, a magnetic disk, or an optical disc.

The foregoing descriptions are not intended to limit embodiments of this application. Any modification, equivalent replacement, or improvement made without departing from the spirit and principle of embodiments of this application shall fall within the protection scope of embodiments of this application.

What is claimed is:

1. An application page development method, comprising:

obtaining a static page of a target application, wherein the static page comprises a plurality of page components;

receiving, from a user, interaction description information, wherein the interaction description information describes a first interaction function corresponding to at least one page component of the page components; and generating an application page of the target application based on the static page and the interaction description information, wherein the application page comprises a second interaction function corresponding to the interaction description information, wherein generating the application page of the target application based on the static page and the interaction description information comprises:

displaying a code of a candidate application page on an interaction optimization interface;

updating the code of the candidate application page based on a modification operation performed by the user on the code of the candidate application page; and displaying the application page of the target application based on updated code.

2. The application page development method of claim 1, wherein the interaction description information is voice information or text information.

3. The application page development method of claim 1, wherein generating the application page of the target application based on the static page and the interaction description information further comprises:

generating, based on the static page and the interaction description information and using an interaction code generation model, interaction code corresponding to the interaction description information;

obtaining candidate application page code of the candidate a plication page; and generating the application page of the target application based on the static page and the interaction code.

4. The application page development method of claim 3, wherein obtaining the candidate application page code of the candidate application page, and generating the application page of the target application based on the static page and the interaction code further comprises:

fusing static page code of the static page and the interaction code in order to obtain the candidate application page code of the candidate application page;

displaying the candidate application page based on the candidate application page code and using the interaction optimization interface; and adjusting the candidate application page based on an interaction function editing operation from the user in order to obtain the application page of the target application.

5. The application page development method of claim 4, wherein the interaction optimization interface further comprises an interface tool set, wherein the interface tool set comprises a plurality of interaction tools, wherein each of the plurality of interaction tools indicates an interaction function, and wherein adjusting the candidate application page based on the interaction function editing operation comprises:

receiving a drag operation from the user on a target interaction tool of the plurality of interaction tools;

adding, to the candidate application page code based on the drag operation, code corresponding to a third interaction function indicated by the target interaction tool to generate updated candidate application page code; and providing the application page of the target application based on the updated candidate application page code.

6. The application page development method of claim 4, wherein adjusting the candidate application page based on the interaction function editing operation comprises:

interacting with the user using an artificial intelligence (AI) dialog model in order to obtain interaction function editing information of the candidate application page;

recommending a modification suggestion to the user based on the interaction function editing information and an industry knowledge graph and using the AI dialog model;

receiving, from the user, a confirmation operation on the modification suggestion;

updating, based on the interaction function editing information and the modification suggestion when the confirmation operation is received, the candidate application page code to generate updated candidate application page code; and providing the application page of the target application based on the updated candidate application page code.

7. The application page development method of claim 3, further comprising:

obtaining a plurality of first training samples, wherein each of the plurality of first training samples comprises static page sample code of a static page sample, an interaction description sample corresponding to the static page sample, and interaction code; and training a to-be-trained first artificial intelligence (AI) model based on the plurality of first training samples in order to obtain the interaction code generation model.

8. The application page development method of claim 1, wherein obtaining the static page of the target application comprises:

receiving a design diagram of the application page of the target application;

identifying the design diagram using a static page generation model in order to obtain a plurality of groups of intermediate codes, wherein each of the groups of intermediate codes comprises component information of a page component from the design diagram through identification;

generating a static candidate page corresponding to each of the groups of intermediate codes to obtain a plurality of static candidate pages;

determining a first static candidate page from the plurality of static candidate pages; and generating the static page of the target application based on the first static candidate page.

9. The application page development method of claim 8, wherein generating the static page of the target application based on the first static candidate page comprises:

displaying the first static candidate page using the interaction optimization interface;

receiving, from the user, an adjustment operation; and adjusting the first static candidate page based on the adjustment operation in order to obtain the static page of the target application.

10. The application page development method of claim 9, wherein the adjustment operation comprises at least one of: a first operation of adding a component, a second operation of deleting a component, or a third operation of modifying a component on the first static candidate page, wherein the third operation comprises modifying a location, a style, and a size of the component, and wherein the adjustment operation comprises at least one of a fourth operation of dragging a component or a fifth operation of configuring an attribute value of a component.

11. A computing device comprising:

a memory configured to store instructions; and one or more processors coupled to the memory and configured to execute the instructions to cause the computing device to:

obtain a static page of a target application, wherein the static page comprises a plurality of page components;

receive, from a user, interaction description information, wherein the interaction description information describes a first interaction function corresponding to at least one page component of the page components; and generate an application page of the target application based on the static page and the interaction description information, wherein the application page comprises a second interaction function corresponding to the interaction description information, wherein generating the application page of the target application based on the static page and the interaction description information comprises:

displaying a code of a candidate application page on an interaction optimization interface;

updating the code of the candidate application page based on a modification operation performed by the user on the code of the candidate application page; and displaying the application page of the target application based on updated code.

12. The computing device of claim 11, wherein the interaction description information is voice information or text information.

13. The computing device of claim 12, wherein the one or more processors are further configured to execute the instructions to cause the computing device to further generate the application page of the target application based on the static page and the interaction description information by:

generating, based on the static page and the interaction description information and using an interaction code generation model, interaction code corresponding to the interaction description information;

obtaining candidate application page code of the candidate application page; and generating the application page of the target application based on the static page and the interaction code.

14. The computing device of claim 13, wherein the one or more processors are further configured to execute the instructions to cause the computing device to obtain the candidate application page code of the candidate application page and generate the application page of the target application based on the static page and the interaction code by:

fusing static page code of the static page and the interaction code in order to obtain the candidate application page code of the candidate application page;

displaying the candidate application page based on the candidate application page code and using the interaction optimization interface; and adjusting the candidate application page based on an interaction function editing operation from the user in order to obtain the application page of the target application.

15. The computing device of claim 14, wherein the one or more processors are further configured to execute the instructions to cause the computing device to adjust the candidate application page based on the interaction function editing operation by:

interacting with the user by using an artificial intelligence (AI) dialog model in order to obtain interaction function editing information of the candidate application page;

recommending a modification suggestion to the user based on the interaction function editing information and an industry knowledge graph and using the AI dialog model;

receiving, from the user, a confirmation operation performed on the modification suggestion;

updating, based on the interaction function editing information and the modification suggestion when the confirmation operation is received, the candidate application page code to generate updated candidate application page code; and providing the application page of the target application based on the updated candidate application page code.

16. The computing device of claim 14, wherein the interaction optimization interface further comprises the candidate application page code, and wherein the one or more processors are further configured to execute the instructions to cause the computing device to adjust the candidate application page based on the interaction function editing operation by:

receiving, from the user, the modification operation on the candidate application page code;

updating, based on the modification operation, the candidate application page code to generate updated candidate application page code; and providing the application page of the target application based on the updated candidate application page code.

17. The computing device of claim 13, wherein the one or more processors are further configured to execute the instructions to cause the computing device to:

obtain a plurality of first training samples, wherein each of the first training samples comprises static page sample code of a static page sample, an interaction description sample corresponding to the static page sample, and interaction code; and train a to-be-trained first artificial intelligence (AI) model based on the plurality of first training samples in order to obtain the interaction code generation model.

18. The computing device of claim 11, wherein the one or more processors are further configured to execute the instructions to cause the computing device to obtain the static page of the target application by:

receiving a design diagram of the application page of the target application;

identifying the design diagram using a static page generation model in order to obtain a plurality of groups of intermediate codes, wherein each of the groups of intermediate codes comprises component information of a page component from the design diagram through identification;

generating a static candidate page corresponding to each of the groups of intermediate codes to obtain a plurality of static candidate pages;

determining a first static candidate page from the plurality of static candidate pages; and generating the static page of the target application based on the first static candidate page.

* * * * *